(12) United States Patent
Doherty et al.

(10) Patent No.: US 11,876,374 B2
(45) Date of Patent: Jan. 16, 2024

(54) SYSTEM AND METHOD FOR OPTIMAL CONTROL OF ENERGY STORAGE SYSTEM

(71) Applicant: IHI TERRASUN SOLUTIONS INC., Chicago, IL (US)

(72) Inventors: Tristan Doherty, Somerville, MA (US); Sergey Crane, Somerville, MA (US); Yuji Koguma, Yokohama (JP); Marco Ferrara, Boston, MA (US)

(73) Assignee: IHI Terrasun Solutions Inc., Chicago, IL (US)

( * ) Notice: Subject to any disclaimer, the term of this patent is extended or adjusted under 35 U.S.C. 154(b) by 296 days.

(21) Appl. No.: 16/916,778

(22) Filed: Jun. 30, 2020

(65) Prior Publication Data

US 2020/0350766 A1 Nov. 5, 2020

Related U.S. Application Data

(63) Continuation of application No. 16/193,332, filed on Nov. 16, 2018, now Pat. No. 10,734,811.
(Continued)

(51) Int. Cl.
*H02J 3/32* (2006.01)
*H02J 3/00* (2006.01)
(Continued)

(52) U.S. Cl.
CPC ............ *H02J 3/32* (2013.01); *G05B 13/042* (2013.01); *H02J 3/003* (2020.01); *G05B 13/027* (2013.01); *H02J 2203/20* (2020.01)

(58) Field of Classification Search
None
See application file for complete search history.

(56) References Cited

U.S. PATENT DOCUMENTS

| 7,698,233 B1 | 4/2010 | Edwards et al. |
| 8,095,245 B1 * | 1/2012 | Mannepalli ............ F24S 50/00 700/297 |

(Continued)

FOREIGN PATENT DOCUMENTS

| CA | 2745357 A1 | 1/2012 |
| CN | 1732441 A | 2/2006 |

(Continued)

OTHER PUBLICATIONS

García et al., "Optimal Economic Dispatch for Renewable Energy Microgrids with Hybrid Storage using Model Predictive Control", Nov. 2013, IEEE.IECON 2013—39th Annual Conference of the IEEE Industrial Electronics Society. (Year: 2013).*

(Continued)

*Primary Examiner* — Mohammad Ali
*Assistant Examiner* — Kelvin Booker

(57) ABSTRACT

Systems and method for optimal control of one or more energy storage systems are provided. Based on live, historical, and/or forecast data received from one or more data sources, one or more forecasts of one or more parameters relating to the operation of the one or more energy storage systems and an associated forecast uncertainty may be calculated by various forecasting techniques. Using one or more optimization techniques, an optimal dispatch schedule for the operation of the one or more energy storage systems may be created based on the forecasts. The optimal dispatch schedule may be used to determine one or more energy storage system parameters, which are used to control the operation of the energy storage systems.

28 Claims, 12 Drawing Sheets

Related U.S. Application Data

(60) Provisional application No. 62/591,023, filed on Nov. 27, 2017.

(51) Int. Cl.
  G05B 13/04 (2006.01)
  G05B 13/02 (2006.01)

(56) References Cited

U.S. PATENT DOCUMENTS

| | | | |
|---|---|---|---|
| 8,145,362 B2 | 3/2012 | Weir et al. | |
| 8,583,520 B1 | 11/2013 | Forbes, Jr. | |
| 8,588,991 B1 | 11/2013 | Forbes, Jr. | |
| 9,335,747 B2 | 5/2016 | Steven et al. | |
| 9,509,176 B2 | 11/2016 | Carter et al. | |
| 9,645,596 B1 | 5/2017 | Lee et al. | |
| 9,652,828 B1 | 5/2017 | Sabripour et al. | |
| 9,798,343 B2 | 10/2017 | Kaufman | |
| 9,851,700 B2 | 12/2017 | Sun et al. | |
| 9,946,285 B2* | 4/2018 | Binding | G05F 1/66 |
| 10,170,932 B2 | 1/2019 | Carter et al. | |
| 10,186,902 B2 | 1/2019 | Carter et al. | |
| 10,574,087 B2 | 2/2020 | Carter et al. | |
| 10,734,811 B2 | 8/2020 | Doherty et al. | |
| 11,095,152 B2 | 8/2021 | Carter et al. | |
| 11,131,974 B2 | 9/2021 | Kaucic et al. | |
| 2006/0276938 A1 | 12/2006 | Miller | |
| 2009/0040029 A1 | 2/2009 | Bridges et al. | |
| 2011/0035073 A1 | 2/2011 | Ozog | |
| 2011/0087381 A1* | 4/2011 | Hirato | H02J 3/32 |
| | | | 700/291 |
| 2011/0231028 A1 | 9/2011 | Ozog et al. | |
| 2012/0010757 A1 | 1/2012 | Francino et al. | |
| 2012/0053750 A1 | 3/2012 | Viassolo et al. | |
| 2012/0053900 A1 | 3/2012 | Maini | |
| 2012/0054139 A1 | 3/2012 | Nikovski | |
| 2012/0059526 A1 | 3/2012 | Maini | |
| 2012/0065805 A1 | 3/2012 | Montalvo et al. | |
| 2012/0078432 A1 | 3/2012 | Weatherhead | |
| 2012/0133337 A1 | 5/2012 | Rombouts et al. | |
| 2012/0153888 A1 | 6/2012 | Jung | |
| 2012/0193984 A1* | 8/2012 | Krok | H02J 3/1878 |
| | | | 307/31 |
| 2012/0296482 A1 | 11/2012 | Steven et al. | |
| 2013/0054863 A1* | 2/2013 | Imes | H04L 47/70 |
| | | | 709/223 |
| 2013/0076140 A1* | 3/2013 | Darden | H02J 3/46 |
| | | | 307/64 |
| 2013/0090900 A1 | 4/2013 | Gering | |
| 2013/0158727 A1 | 6/2013 | Park | |
| 2013/0162037 A1 | 6/2013 | Kim et al. | |
| 2013/0190938 A1* | 7/2013 | Zadeh | H02J 3/003 |
| | | | 700/291 |
| 2013/0261823 A1 | 10/2013 | Krok et al. | |
| 2013/0274935 A1* | 10/2013 | Deshpande | H02J 3/28 |
| | | | 700/291 |
| 2014/0005849 A1 | 1/2014 | Sun et al. | |
| 2014/0012428 A1 | 1/2014 | Taniguchi et al. | |
| 2014/0018971 A1 | 1/2014 | Ellis et al. | |
| 2014/0039709 A1 | 2/2014 | Steven et al. | |
| 2014/0067140 A1 | 3/2014 | Gow | |
| 2014/0129040 A1* | 5/2014 | Emadi | G06Q 50/06 |
| | | | 700/291 |
| 2014/0139200 A1 | 5/2014 | Cho | |
| 2014/0172183 A1 | 6/2014 | Beeman | |
| 2014/0277788 A1 | 9/2014 | Forbes, Jr. | |
| 2014/0277797 A1* | 9/2014 | Mokhtari | G06Q 50/06 |
| | | | 700/291 |
| 2014/0304025 A1 | 10/2014 | Steven et al. | |
| 2014/0350743 A1 | 11/2014 | Asghari et al. | |
| 2014/0351234 A1 | 11/2014 | Maddison et al. | |
| 2015/0094968 A1* | 4/2015 | Jia | G05B 15/02 |
| | | | 702/60 |
| 2015/0127179 A1* | 5/2015 | Binding | G05B 13/026 |
| | | | 700/291 |
| 2015/0160672 A1* | 6/2015 | Hakim | B60L 53/65 |
| | | | 700/291 |
| 2015/0188482 A1* | 7/2015 | Berkowitz | H02S 40/38 |
| | | | 320/101 |
| 2016/0036272 A1 | 2/2016 | Wartena | |
| 2016/0043548 A1 | 2/2016 | Bozchalui et al. | |
| 2016/0077507 A1 | 3/2016 | Sheble | |
| 2016/0172899 A1* | 6/2016 | Taniguchi | H02J 7/35 |
| | | | 320/101 |
| 2016/0197519 A1* | 7/2016 | Carter | G06Q 10/06 |
| | | | 700/291 |
| 2016/0209857 A1* | 7/2016 | Nakasone | G05F 1/66 |
| 2017/0005515 A1* | 1/2017 | Sanders | G05B 15/02 |
| 2017/0317528 A1* | 11/2017 | Fife | G05B 17/02 |
| 2017/0322525 A1 | 11/2017 | Al-Mohssen et al. | |
| 2017/0322530 A1 | 11/2017 | Al-Mohssen et al. | |
| 2017/0322577 A1 | 11/2017 | Al-Mohssen et al. | |
| 2017/0323207 A1 | 11/2017 | Al-Mohssen et al. | |
| 2017/0323208 A1 | 11/2017 | Al-Mohssen et al. | |
| 2017/0323338 A1 | 11/2017 | Al-Mohssen et al. | |
| 2017/0323339 A1 | 11/2017 | Al-Mohssen et al. | |
| 2017/0331298 A1* | 11/2017 | Mcdaniel | H02J 3/008 |
| 2018/0217568 A1 | 8/2018 | Parvania | |
| 2018/0356770 A1 | 12/2018 | ElBsat et al. | |
| 2018/0357577 A1 | 12/2018 | ElBsat et al. | |
| 2019/0072943 A1 | 3/2019 | Przybylski | |
| 2020/0220382 A1 | 7/2020 | Carter et al. | |
| 2020/0386814 A1 | 12/2020 | Fogarty et al. | |
| 2020/0409324 A1 | 12/2020 | Liu et al. | |
| 2021/0159700 A1 | 5/2021 | Khatib et al. | |
| 2021/0344225 A1 | 11/2021 | Carter et al. | |

FOREIGN PATENT DOCUMENTS

| | | |
|---|---|---|
| CN | 103117568 A | 5/2013 |
| CN | 106777487 A | 5/2017 |
| CN | 106911148 A | 6/2017 |
| CN | 107370170 A | 11/2017 |
| JP | 2013115927 A | 6/2013 |
| JP | 2016062191 A | 4/2016 |
| WO | WO-2005048105 A1 | 5/2005 |
| WO | WO-2013152188 A1 | 10/2013 |
| WO | WO 2016/036806 A1 | 3/2016 |
| WO | WO-2017098631 A1 | 6/2017 |
| WO | WO 2018/032091 A1 | 2/2018 |
| WO | WO-2018131174 A1 | 7/2018 |

OTHER PUBLICATIONS

Mahmoodi et al., "Economic Dispatch of a Hybrid Microgrid With Distributed Energy Storage", Nov. 2015, IEEE Transactions on Smart Grid, vol. 6, No. 6. (Year: 2015).*

Reihani et al., "Energy management at the distribution grid using a Battery Energy Storage System (BESS)", Dec. 2014, Electrical Power and Energy Systems 77 (2016) 337-344. (Year: 2014).*

Mariaud et al., "Integrated optimisation of photovoltaic and battery storage systems for UK commercial buildings", Feb. 2017, Applied Energy 199 (2017) 466-478. (Year: 2017).*

Lorenzi et al., "Comparing demand response and battery storage to optimize self-consumption in PV systems", Jan. 2016, Applied Energy 180 (2016) 524-535. (Year: 2016).*

Liu et al., "Dispatch Scheduling for a Wind Farm With Hybrid Energy Storage Based on Wind and LMP Forecasting", Jun. 2014, IEEE Transactions on Industry Applications, vol. 51, No. 3, May/Jun. 2015. (Year: 2014).*

Hanna et al., "Energy dispatch schedule optimization for demand charge reduction using a photovoltaic-battery storage system with solar forecasting", Sep. 2013, Solar Energy 103 (2014) 269-287. (Year: 2013).*

O'Shaughnessy et al., "Solar plus: Optimization of distributed solar PV through battery storage and dispatchable load in residential buildings", Oct. 2017, Applied Energy 213 (2018) 11-21. (Year: 2017).*

(56) References Cited

OTHER PUBLICATIONS

Dongol et al., "A model predictive control based peak shaving application of battery for a household with photovoltaic system in a rural distribution grid", Nov. 2017, Sustainable Energy, Grids and Networks 16 (2018) 1-13. (Year: 2017).*
International Serach Report dated Aug. 2, 2013 for International Application No. PCT/US2013/035270, 2 pages.
International Search Report and Written Opinion dated Jan. 23, 2019 for International Application No. PCT/US2018/061763, 10 pages.
Bathurst, G. N. & Strbac, G., "Value of combining energy storage and wind in short-term energy and balancing markets," Electric Power Systems Research, 67:1-8 (2003).
Black, M. & Strbac, G., "Value of Bulk Energy Storage for Managing Wind Power Fluctuations," IEEE Transactions on Energy Conversion, 22(1):197-205 (2007).
Celli, G. et al., "Optimal Integration of Energy Storage in Distribution Networks," IEEE Bucharest Power Tech Conference, Jun. 28-Jul. 2, 2009, 7 pages; https://ieeexplore.ieee.org/xpl/conhome/5271856/proceeding.
Kingston, T. & Stovall, T., "Exploring Distributed Energy Alternatives to Electrical Distribution Grid Expansion," In Southern California Energy Program Report, Dec. 2005, 113 pages.
Leou, R.-C., "An Economic Analysis Model for the Energy Storage Systems in a Deregulated Market," 2008 IEEE International Conference on Sustainable Energy Technologies, Nov. 24-27, 2008, 6 pages; doi:10.1109/ICSET.2008.4747105.
Lo, C. H. & Anderson, M. D., "Economic Dispatch and Optimal Sizing of Battery Energy Storage Systems in Utility Load-Leveling Operations," IEEE Transactions on Energy Conversion, 14(3):824-829 (1999).
Mercier, P. et al., "Optimizing a Battery Energy Storage System for Frequency Control Application in an Isolated Power System," IEEE Transactions on Power Systems, 24(3):1469-1477 (2009).
Oudalov, A. et al., "Value Analysis of Battery Energy Storage Applications in Power Systems," 2006 IEEE PES Power Systems Conference and Exposition, Oct. 29-Nov. 1, 2006, 6 pages; doi:10.1109/PSCE.2006.296284.
Tanabe, T. et al., "Generation Scheduling for Wind Power Generation by Storage Battery System and Meteorological Forecast," 2008 IEEE Power and Energy Society General Meeting—Conversion and Delivery of Electrical Energy in the 21st Century, Jul. 20-24, 2008, 7 pages; 10.1109/PES.2008.4596116.
Teleke, S. et al., Control Strategies for Battery Energy Storage for Wind Farm Dispatching, IEEE Transactions on Energy Conversion, 24(3):725-732 (2009).
Teleke, S. et al., "Optimal Control of Battery Energy Storage for Wind Farm Dispatching," IEEE Transactions on Energy Conversion, 25(3):787-794 (2010).
Teleke, S. et al., "Rule-Based Control of Battery Energy Storage for Dispatching Intermittent Renewable Sources," IEEE Transactions on Sustainable Energy, 1(3):117-124 (2010).
Tuohy, A. et al., "Unit Commitment for systems With Significant Wind Penetration," IEEE Transactions on Power Systems, 24(2):592-601 (2009).
Xi, X. & Sioshansi, R., "A Stochastic Dynamic Programming Model for Co-optimization of Distributed Energy Storage," Management Science, 5:475 (2014), 20 pages; https://doi.org/10.1007/s12667-013-0100-6.
Chinese Office Action for Application No. CN20188076507 dated Dec. 31, 2021, with English translation, 31 pages.
Extended European Search Report dated Jul. 29, 2021 for European Application No. 18880472.8, 10 pages.
First Office Action dated Jun. 1, 2021 for Chinese Application No. 201880076507.1, with English translation, 21 pages.
Japanese Office Action for Application No. JP20200526425 dated Aug. 24, 2022, with English translation, 16 pages.
Office Action for Australian Application No. AU20180372847, dated Aug. 23, 2022, 3 pages.
Notice of Allowance for Chinese Application No. CN201880076507, dated Apr. 26, 2022, 4 pages.
Rahmani-Andebili, M., "Stochastic, adaptive, and dynamic control of energy storage systems integrated with renewable energy sources for power loss minimization," Renewable Energy, 113:1462-1471 (2017).
Decision to Grant for Japanese Application No. JP20200526425 dated May 25, 2023, with English translation, 6 pages.
Office Action for Korean Application No. KR20207015501 dated Jun. 12, 2023, with English translation, 17 pages.
Examination Report dated May 3, 2023 for European Application No. 18880472.8, 7 pages.
Office Action for Canadian Application No. CA3081764 dated Nov. 8, 2023, 5 pages.

* cited by examiner

SYSTEM AND METHOD FOR OPTIMAL CONTROL OF ENERGY STORAGE SYSTEM

CROSS-REFERENCE TO RELATED APPLICATIONS

This application is a continuation of U.S. patent application Ser. No. 16/193,332, filed on Nov. 16, 2018, which in turn claims the benefit under 35 U.S.C. § 119(e) of U.S. Provisional Patent Application Ser. No. 62/591,023, filed on Nov. 27, 2017, the contents of each of which are incorporated by reference herein in their entireties.

BACKGROUND

It is generally recognized that the installation and use of an energy storage system ("ESS") on an electrical grid can result in material benefits (operational, financial, environmental, etc.) to grid participants and/or stakeholders, and by doing so can generate material financial returns to an entity owning or controlling the energy storage assets. Energy storage techniques can generate these kinds of benefits through a range of potential energy storage applications ("ES applications"), such as (i) the provision of certain ancillary services for which there are established energy or capacity market mechanisms (e.g., frequency regulation, spinning reserves, black start capacity), (ii) load shifting or peak shaving, (iii) deferral or avoidance of otherwise necessary transmission or distribution upgrades, (iv) relief of transmission or distribution bottlenecks or other constraints, (v) integration of intermittent renewable generation, whether through smoothing, ramping services, the provision of shaped power or otherwise, (vi) hybridization of generation assets to increase fuel efficiency or reduce carbon emissions, (vii) provision of backup power or uninterruptable power system ("UPS") during islanded operation, (viii) time shifting of energy purchases and sales for cost saving or arbitrage purposes, (ix) provision (or committed availability to provide) of various operating reserves, (x) provision of power, energy or services that might otherwise be provided by a natural gas peaking plant or other power generation sources, to name a few. The foregoing is intended to be a representative listing of ES applications, and not an exhaustive listing. In many cases a single ESS installed in a specific location can provide multiple ES applications (sometimes referred to as the stacking of applications). As used herein, references to a single ES application may include a combination or stacking of multiple ES applications.

The existence and extent of the benefits and/or related financial returns from a specific installation and use of an ESS can be dependent on a broad range of factors. These factors include the cost of the ESS (which is generally measured in terms of $/kW and/or $/kWh), the ESS's ratio of power to energy, the size of the ESS (in kW or kWh), the round trip efficiency of the ESS, the cycle life and/or useful life of the ESS, the manner in which acquisition of the ESS is financed, the site and installation costs of the ESS, the ongoing operating and maintenance costs of the ESS. Additional factors can also relate to the location of the ESS installation and the ES application(s) for which it is used. These factors can include energy prices and other market conditions, the specific grid conditions giving rise to a need for the ES application, the pricing/compensation/tariffs or other incentives available for the product or service provided by the ES application, the reliability of forecasts of available power, and the mix of generation assets serving the geographic (or the collection of electrical connections to an ESS) area that includes the ESS.

There currently exist a number of sophisticated models that can be used to control an ESS. These models are however limited in that they only reflect abstract representations of a possible reality and assume perfect foresight. In practice, operational conditions of a typical ESS in the field are most often dynamic and different from these abstract models and their assumptions and the forecasts based on these models can only be made within a limited degree of certainty and accuracy. Hence, needs exist for systems and methods that provide technical solutions in terms of modeling at a higher degree of certainty and accuracy. In particular, in the fields of ESS operational control, needs exist for technical solutions that are capable of achieving one or more, or any possible combination of, at least the following technical objectives: (1) optimal performance in ongoing future prediction of ESS parameters, such as electrical quantities, that affect ESS configuration and operation; (2) quantification of forecast uncertainty and provision for adequate remediation strategies; and (3) scheduling and dispatching an ESS adaptively to track dynamic and evolving ESS parameters, such as electrical parameters.

SUMMARY

Embodiments of the disclosed subject matter can relate to a general methodology for creating and executing an optimal dispatch schedule for controlling an operation of one or more energy storage systems. Embodiments of the disclosed subject matter can also relate to techniques for producing one or more forecasts using various forecasting techniques or algorithms and, based on the forecasts, calculating an optimal dispatch schedule for controlling the operation of one or more energy storage systems and compensating for real-time forecast uncertainty in between schedule updates, all on a rolling basis. Embodiments of the disclosed subject matter can also provide techniques for calculating optimal economic dispatch across various possible forecast scenarios and determining a statistically optimal dispatch schedule for controlling the operation of one or more energy storage systems. Embodiments of the disclosed subject matter can also relate to techniques for calculating optimal ESS dispatch schedule on an ongoing basis and compensating for forecast uncertainty. Embodiments of the disclosed subject matter can also use parallel processing to speed up computations for forecasts and/or dispatch schedules. Embodiments of the disclosed subject matter can also relate to systems and methods providing technical solutions that are capable of achieving one or more or any possible combination of the following technological objectives: (1) optimal performance in ongoing future prediction of ESS parameters, such as electrical quantities, that affect ESS configuration and operation; (2) quantification of forecast uncertainty and provision for adequate remediation strategies; and (3) scheduling and dispatching an ESS adaptively to track dynamic and evolving ESS parameters, such as electrical parameters. Other embodiments are within the scope of the invention.

At least one embodiment of the present invention relates to a method for controlling an operation of one or more energy storage systems, the method comprising the steps of (a) receiving, at a computer system including at least one computer, live, historical, or forecast data related to the operation of the one or more energy storage systems from one or more data sources; (b) calculating, by the computer system, one or more forecasts of one or more parameters relating to the operation of the one or more energy storage systems and an associated forecast uncertainty using one or more forecasting techniques based on the received live, historical, or forecast data; (c) determining, by the computer system, an optimal dispatch schedule for the operation of the one or more energy storage systems based on the one or more forecasts; (d) using, by the computer system, the optimal dispatch schedule to determine one or more energy storage system parameters; and (e) sending, by the computer system, the one or more energy storage system parameters to the one or more energy storage systems to control the operation of the one or more energy storage systems.

In a further embodiment, the one or more forecasting techniques comprise at least one of third party forecast pass-through technique, multiple third party forecasts aggregation technique, historical average forecast technique, linear regression forecast technique, linear regression with historical average residual forecast technique and neural network forecast technique.

In a further embodiment, the step (b) of calculating one or more forecasts comprises aggregating, by the computer system, the calculated one or more forecasts using averaging, weighted averaging, time-variable weighted averaging, condition variable weighted averaging, or neural network.

In a further embodiment, the step (c) of determining an optimal dispatch schedule comprises (i) generating, by the computer system, one or more forecast scenarios using at least one of single forecast pass-through technique, Monte-Carlo scenario generation technique and chance constrained optimization constraint generation technique; (ii) selecting, by the computer system, one or more sets of the generated one or more forecast scenarios for optimization; (iii) generating, by the computer system, one or more dispatch schedules by applying one or more optimization techniques to the selected one or more sets of the generated one or more forecast scenarios, wherein the one or more optimization techniques comprise at least one of fixed rule scheduler, forecast-based rule scheduler, non-linear multiple rule optimization scheduler, non-linear economic optimization scheduler and neural network scheduler; and (iv) aggregating, by the computer system, the one or more dispatch schedules using averaging, weighted averaging, time-variable weighted averaging, condition variable weighted averaging, or neural network to produce the optimal dispatch schedule.

In a further embodiment, the step (d) of using the optimal dispatch schedule comprises selecting, by the computer system, one or more modes and one or more mode parameters based on the optimal dispatch schedule and the live data received from the one or more data sources, wherein the one or more modes comprise at least one of standby mode, manual mode, load leveling mode, peak shaving mode, trough filling mode, state of charge (SOC) maintenance mode and ramp-rate management mode, and the one or more mode parameters comprise at least one of real and reactive power, target grid net real power, maximum grid net real power, minimum grid net real power, target state of charge and maximum grid net real power rate of change.

In a further embodiment, the live, historical, or forecast data in the step (a) comprises live, historical, or third party forecast data relating to energy price for real-time markets, energy price for day-ahead markets, ancillary services price for real-time markets, ancillary services price for day-ahead markets, weather, electricity demand and power generator availability; the one or more forecasting techniques in the step (b) comprise neural network forecast technique; and the step (c) of determining an optimal dispatch schedule comprises (i) generating, by the computer system, one or more forecast scenarios for the energy price for real-time markets, the energy price for day-ahead markets, the ancillary services price for real-time markets and the ancillary services price for day-ahead markets using Monte-Carlo scenario generation technique; (ii) selecting, by the computer system, one or more sets of the generated one or more forecast scenarios that are more similar to one another, more different from one another, or randomly distributed across the generated one or more forecast scenarios; (iii) generating, by the computer system, one or more dispatch schedules by applying non-linear economic optimization scheduler to the selected one or more sets of the generated one or more forecast scenarios; and (iv) averaging, by the computer system, the generated one or more dispatch schedules to produce the optimal dispatch schedule.

In a further embodiment, the live, historical, or forecast data in the step (a) comprises live, historical, or third party forecast data relating to net substation load, solar generation and temperature; the step (b) of calculating one or more forecasts comprises creating, by the computer system, at least two forecasts for the net substation load by simultaneously using linear regression with historical average residual forecast technique and neural network forecast technique and producing, by the computer system, the one or more forecasts by either selecting one of the at least two forecasts based on historically expected uncertainty associated with each of the at least two forecasts, or averaging the at least two forecasts; and the step (c) of determining an optimal dispatch schedule comprises (i) generating, by the computer system, a predetermined number of forecast scenarios for the net substation load using Monte-Carlo scenario generation technique; (ii) selecting, by the computer system, a subset of the generated predetermined number of forecast scenarios based on system configuration, available computational time and resources, or reported forecast uncertainty; (iii) generating, by the computer system, a dispatch schedule for each of the selected subset of the generated predetermined number of forecast scenarios by using non-linear multiple rule optimization scheduler to minimize a peak net substation load after the operation of the one or more energy storage systems; and (iv) averaging, by the computer system, the generated dispatch schedules for the selected subset of the generated predetermined number of forecast scenarios to produce the optimal dispatch schedule.

In a further embodiment, the one or more energy storage systems comprise a battery system comprising one or more inverters and one or more battery management controllers; the live, historical, or forecast data in the step (a) comprises live, historical, or third party forecast data relating to weather and load; the step (b) of calculating one or more forecasts comprises producing, by the computer system, the one or more forecasts by calculating probability of a system peak occurring in each of next twenty-four hours using neural network forecast technique based on the received live, historical, or third party forecast data relating to weather and load; and the step (c) of determining an optimal dispatch schedule comprises determining, by the computer system, the optimal dispatch schedule based on the one or more forecasts using a forecast based rule scheduler to minimize customer load and maximize an output of the one or more energy storage systems during a peak hour; and the step (d) of using the optimal dispatch schedule to determine one or more energy storage system parameters comprises determining, by the computer system, real power and reactive power to input or extract from a grid or a microgrid connected to the battery system based on the optimal dispatch schedule and the live data received from the one or more data sources.

In a further embodiment, the one or more parameters in the step (b) comprise at least one of grid net load, renewable generation, non-renewable generation, market pricing and customer load.

In a further embodiment, the step (b) of calculating one or more forecasts comprises generating, by the computer system, a new forecast as soon as new relevant data is available, on a fixed schedule, or on an as-needed manually controlled basis.

In a further embodiment, the received live data comprises data relating to at least one of weather conditions, electrical generation, third-party forecasts, grid load conditions, energy storage conditions, market conditions and utility/independent system operators (ISO) signals.

In a further embodiment, the received historical data comprises data relating to at least one of weather conditions, electrical generation, third-party forecasts, grid load conditions, energy storage conditions, market conditions and utility/independent system operators (ISO) signals.

In a further embodiment, the step (c) of determining an optimal dispatch schedule comprises generating, by the computer system, a new optimal dispatch schedule as soon as new relevant data is available, on a fixed schedule, or on an as-needed manually controlled basis.

In a further embodiment, the one or more energy storage system parameters comprise real power or reactive power.

In addition, at least one embodiment of the present invention relates to a computer system for controlling an operation of one or more energy storage systems, the computer system comprising one or more processors; and one or more memories operatively connected to the one or more processors and having stored thereon instructions that are executable by the one or more processors to cause the computer system to perform the steps of (a) receiving, at the computer system, live, historical, or forecast data related to the operation of the one or more energy storage systems from one or more data sources; (b) calculating, by the computer system, one or more forecasts of one or more parameters relating to the operation of the one or more energy storage systems and an associated forecast uncertainty using one or more forecasting techniques based on the received live, historical, or forecast data; (c) determining, by the computer system, an optimal dispatch schedule for the operation of the one or more energy storage systems based on the one or more forecasts; (d) using, by the computer system, the optimal dispatch schedule to determine one or more energy storage system parameters; and (e) sending, by the computer system, the one or more energy storage system parameters to the one or more energy storage systems to control the operation of the one or more energy storage systems.

In a further embodiment, the one or more forecasting techniques comprise at least one of third party forecast pass-through technique, multiple third party forecasts aggregation technique, historical average forecast technique, linear regression forecast technique, linear regression with historical average residual forecast technique and neural network forecast technique.

In a further embodiment, the step (b) of calculating one or more forecasts comprises aggregating, by the computer system, the calculated one or more forecasts using averaging, weighted averaging, time-variable weighted averaging, condition variable weighted averaging, or neural network.

In a further embodiment, the step (c) of determining an optimal dispatch schedule comprises (i) generating, by the computer system, one or more forecast scenarios using at least one of single forecast pass-through technique, Monte-Carlo scenario generation technique and chance constrained optimization constraint generation technique; (ii) selecting, by the computer system, one or more sets of the generated one or more forecast scenarios for optimization; (iii) generating, by the computer system, one or more dispatch schedules by applying one or more optimization techniques to the selected one or more sets of the generated one or more forecast scenarios, wherein the one or more optimization techniques comprise at least one of fixed rule scheduler, forecast-based rule scheduler, non-linear multiple rule optimization scheduler, non-linear economic optimization scheduler and neural network scheduler; and (iv) aggregating, by the computer system, the one or more dispatch schedules using averaging, weighted averaging, time-variable weighted averaging, condition variable weighted averaging, or neural network to produce the optimal dispatch schedule.

In a further embodiment, the step (d) of using the optimal dispatch schedule comprises selecting, by the computer system, one or more modes and one or more mode parameters based on the optimal dispatch schedule and the live data received from the one or more data sources, wherein the one or more modes comprise at least one of standby mode, manual mode, load leveling mode, peak shaving mode, trough filling mode, state of charge (SOC) maintenance mode and ramp-rate management mode, and the one or more mode parameters comprise at least one of real and reactive power, target grid net real power, maximum grid net real power, minimum grid net real power, target state of charge and maximum grid net real power rate of change.

In a further embodiment, the live, historical, or forecast data in the step (a) comprises live, historical, or third party forecast data relating to energy price for real-time markets, energy price for day-ahead markets, ancillary services price for real-time markets, ancillary services price for day-ahead markets, weather, electricity demand and power generator availability; the one or more forecasting techniques in the step (b) comprise neural network forecast technique; and the step (c) of determining an optimal dispatch schedule comprises (i) generating, by the computer system, one or more forecast scenarios for the energy price for real-time markets, the energy price for day-ahead markets, the ancillary services price for real-time markets and the ancillary services price for day-ahead markets using Monte-Carlo scenario generation technique; (ii) selecting, by the computer system, one or more sets of the generated one or more forecast scenarios that are more similar to one another, more different from one another, or randomly distributed across the generated one or more forecast scenarios; (iii) generating, by the computer system, one or more dispatch schedules by applying non-linear economic optimization scheduler to the selected one or more sets of the generated one or more forecast scenarios; and (iv) averaging, by the computer system, the generated one or more dispatch schedules to produce the optimal dispatch schedule.

In a further embodiment, the live, historical, or forecast data in the step (a) comprises live, historical, or third party forecast data relating to net substation load, solar generation and temperature; the step (h) of calculating one or more forecasts comprises creating, by the computer system, at least two forecasts for the net substation load by simultaneously using linear regression with historical average residual forecast technique and neural network forecast technique and producing, by the computer system, the one or more forecasts by either selecting one of the at least two forecasts based on historically expected uncertainty associated with each of the at least two forecasts, or averaging the at least two forecasts; and the step (c) of determining an optimal dispatch schedule comprises (i) generating, by the computer system, a predetermined number of forecast scenarios for the net substation load using Monte-Carlo scenario generation technique; (ii) selecting, by the computer system, a subset of the generated predetermined number of forecast scenarios based on system configuration, available computational time and resources, or reported forecast uncertainty; (iii) generating, by the computer system, a dispatch schedule for each of the selected subset of the generated predetermined number of forecast scenarios by using non-linear multiple rule optimization scheduler to minimize a peak net substation load after the operation of the one or more energy storage systems; and (iv) averaging, by the computer system, the generated dispatch schedules for the selected subset of the generated predetermined number of forecast scenarios to produce the optimal dispatch schedule.

In a further embodiment, the one or more energy storage systems comprise a battery system comprising one or more inverters and one or more battery management controllers; the live, historical, or forecast data in the step (a) comprises live, historical, or third party forecast data relating to weather and load; the step (b) of calculating one or more forecasts comprises producing, by the computer system, the one or more forecasts by calculating probability of a system peak occurring in each of next twenty-four hours using neural network forecast technique based on the received live, historical, or third party forecast data relating to weather and load; the step (c) of determining an optimal dispatch schedule comprises determining, by the computer system, the optimal dispatch schedule based on the one or more forecasts using a forecast based rule scheduler to minimize customer load and maximize an output of the one or more energy storage systems during a peak hour; and the step (d) of using the optimal dispatch schedule to determine one or more energy storage system parameters comprises determining, by the computer system, real power and reactive power to input or extract from a grid or a microgrid connected to the battery system based on the optimal dispatch schedule and the live data received from the one or more data sources.

In a further embodiment, the one or more parameters in the step (b) comprise at least one of grid net load, renewable generation, non-renewable generation, market pricing and customer load.

In a further embodiment, the step (b) of calculating one or more forecasts comprises generating, by the computer system, a new forecast as soon as new relevant data is available, on a fixed schedule, or on an as-needed manually controlled basis.

In a further embodiment, the received live data comprises data relating to at least one of weather conditions, electrical generation, third-party forecasts, grid load conditions, energy storage conditions, market conditions and utility/independent system operators (ISO) signals.

In a further embodiment, the received historical data comprises data relating to at least one of weather conditions, electrical generation, third-party forecasts, grid load conditions, energy storage conditions, market conditions and utility/independent system operators (ISO) signals.

In a further embodiment, the step (c) of determining an optimal dispatch schedule comprises generating, by the computer system, a new optimal dispatch schedule as soon as new relevant data is available, on a fixed schedule, or on an as-needed manually controlled basis.

In a further embodiment, the one or more energy storage system parameters comprise real power or reactive power.

In a further embodiment, the computer system further comprises a data input interface operatively connected to at least one of the one or more processors and the one or more memories, wherein the data input interface receives the live, historical, or forecast data from the one or more data sources.

In a further embodiment, the data input interface detects missing metadata associated with the received live, historical, or forecast data and adds the missing metadata to the received live, historical, or forecast data.

In a further embodiment, the computer system further comprises a user visualization and control interface operatively connected to at least one of the one or more processors and the one or more memories.

In a further embodiment, the user visualization and control interface comprises a web-based graphical user interface displayed on a display device.

In a further embodiment, the computer system further comprises a data historian comprising one or more data stores operatively connected to at least one of the one or more processors and the one or more memories, wherein the one or more data stores collect and store data received and generated by the computer system.

Furthermore, at least one embodiment of the present invention relates to a non-transitory computer readable medium having stored thereon program code configured for execution by a computer system comprising at least one computer, wherein, when executed by the computer system, the program code causes the computer system to perform a method for controlling an operation of one or more energy storage systems, the method comprising the steps of (a) receiving, at the computer system, live, historical, or forecast data related to the operation of the one or more energy storage systems from one or more data sources; (b) calculating, by the computer system, one or more forecasts of one or more parameters relating to the operation of the one or more energy storage systems and an associated forecast uncertainty using one or more forecasting techniques based on the received live, historical, or forecast data; (c) determining, by the computer system, an optimal dispatch schedule for the operation of the one or more energy storage systems based on the one or more forecasts; (d) using, by the computer system, the optimal dispatch schedule to determine one or more energy storage system parameters; and (e) sending, by the computer system, the one or more energy storage system parameters to the one or more energy storage systems to control the operation of the one or more energy storage systems.

In a further embodiment, the one or more forecasting techniques comprise at least one of third party forecast pass-through technique, multiple third party forecasts aggregation technique, historical average forecast technique, linear regression forecast technique, linear regression with historical average residual forecast technique and neural network forecast technique.

In a further embodiment, the step (b) of calculating one or more forecasts comprises aggregating, by the computer system, the calculated one or more forecasts using averaging, weighted averaging, time-variable weighted averaging, condition variable weighted averaging, or neural network.

In a further embodiment, the step (c) of determining an optimal dispatch schedule comprises (i) generating, by the computer system, one or more forecast scenarios using at least one of single forecast pass-through technique, Monte-Carlo scenario generation technique and chance constrained optimization constraint generation technique; (ii) selecting, by the computer system, one or more sets of the generated one or more forecast scenarios for optimization; (iii) generating, by the computer system, one or more dispatch schedules by applying one or more optimization techniques to the selected one or more sets of the generated one or more forecast scenarios, wherein the one or more optimization techniques comprise at least one of fixed rule scheduler, forecast-based rule scheduler, non-linear multiple rule optimization scheduler, non-linear economic optimization scheduler and neural network scheduler; and (iv) aggregating, by the computer system, the one or more dispatch schedules using averaging, weighted averaging, time-variable weighted averaging, condition variable weighted averaging, or neural network to produce the optimal dispatch schedule.

In a further embodiment, the step (d) of using the optimal dispatch schedule comprises selecting, by the computer system, one or more modes and one or more mode parameters based on the optimal dispatch schedule and the live data received from the one or more data sources, wherein the one or more modes comprise at least one of standby mode, manual mode, load leveling mode, peak shaving mode, trough filling mode, state of charge (SOC) maintenance mode and ramp-rate management mode, and the one or more mode parameters comprise at least one of real and reactive power, target grid net real power, maximum grid net real power, minimum grid net real power, target state of charge and maximum grid net real power rate of change.

In a further embodiment, the live, historical, or forecast data in the step (a) comprises live, historical, or third party forecast data relating to energy price for real-time markets, energy price for day-ahead markets, ancillary services price for real-time markets, ancillary services price for day-ahead markets, weather, electricity demand and power generator availability; the one or more forecasting techniques in the step (b) comprise neural network forecast technique; and the step (c) of determining an optimal dispatch schedule comprises (i) generating, by the computer system, one or more forecast scenarios for the energy price for real-time markets, the energy price for day-ahead markets, the ancillary services price for real-time markets and the ancillary services price for day-ahead markets using Monte-Carlo scenario generation technique; (ii) selecting, by the computer system, one or more sets of the generated one or more forecast scenarios that are more similar to one another, more different from one another, or randomly distributed across the generated one or more forecast scenarios; (iii) generating, by the computer system, one or more dispatch schedules by applying non-linear economic optimization scheduler to the selected one or more sets of the generated one or more forecast scenarios; and (iv) averaging, by the computer system, the generated one or more dispatch schedules to produce the optimal dispatch schedule.

In a further embodiment, the live, historical, or forecast data in the step (a) comprises live, historical, or third party forecast data relating to net substation load, solar generation and temperature; the step (b) of calculating one or more forecasts comprises creating, by the computer system, at least two forecasts for the net substation load by simultaneously using linear regression with historical average residual forecast technique and neural network forecast technique and producing, by the computer system, the one or more forecasts by either selecting one of the at least two forecasts based on historically expected uncertainty associated with each of the at least two forecasts, or averaging the at least two forecasts; and the step (c) of determining an optimal dispatch schedule comprises (i) generating, by the computer system, a predetermined number of forecast scenarios for the net substation load using Monte-Carlo scenario generation technique; (ii) selecting, by the computer system, a subset of the generated predetermined number of forecast scenarios based on system configuration, available computational time and resources, or reported forecast uncertainty; (iii) generating, by the computer system, a dispatch schedule for each of the selected subset of the generated predetermined number of forecast scenarios by using non-linear multiple rule optimization scheduler to minimize a peak net substation load after the operation of the one or more energy storage systems; and (iv) averaging, by the computer system, the generated dispatch schedules for the selected subset of the generated predetermined number of forecast scenarios to produce the optimal dispatch schedule.

In a further embodiment, the one or more energy storage systems comprise a battery system comprising one or more inverters and one or more battery management controllers; the live, historical, or forecast data in the step (a) comprises live, historical, or third party forecast data relating to weather and load; the step (b) of calculating one or more forecasts comprises producing, by the computer system, the one or more forecasts by calculating probability of a system peak occurring in each of next twenty-four hours using neural network forecast technique based on the received live, historical, or third party forecast data relating to weather and load; the step (c) of determining an optimal dispatch schedule comprises determining, by the computer system, the optimal dispatch schedule based on the one or more forecasts using a forecast based rule scheduler to minimize customer load and maximize an output of the one or more energy storage systems during a peak hour; and the step (d) of using the optimal dispatch schedule to determine one or more energy storage system parameters comprises determining, by the computer system, real power and reactive power to input or extract from a grid or a microgrid connected to the battery system based on the optimal dispatch schedule and the live data received from the one or more data sources.

In a further embodiment, the one or more parameters in the step (b) comprise at least one of grid net load, renewable generation, non-renewable generation, market pricing and customer load.

In a further embodiment, the step (b) of calculating one or more forecasts comprises generating, by the computer system, a new forecast as soon as new relevant data is available, on a fixed schedule, or on an as-needed manually controlled basis.

In a further embodiment, the received live data comprises data relating to at least one of weather conditions, electrical generation, third-party forecasts, grid load conditions, energy storage conditions, market conditions and utility/independent system operators (ISO) signals.

In a further embodiment, the received historical data comprises data relating to at least one of weather conditions, electrical generation, third-party forecasts, grid load conditions, energy storage conditions, market conditions and utility/independent system operators (ISO) signals.

In a further embodiment, the step (c) of determining an optimal dispatch schedule comprises generating, by the computer system, a new optimal dispatch schedule as soon as new relevant data is available, on a fixed schedule, or on an as-needed manually controlled basis.

In a further embodiment, the one or more energy storage system parameters comprise real power or reactive power.

These and other capabilities of the disclosed subject matter, along with the invention itself, will be more fully understood after a review of the following figures, detailed description, and claims.

BRIEF DESCRIPTION OF THE DRAWINGS

Exemplary embodiments of the present invention will be described with references to the accompanying figures, wherein.

DETAILED DESCRIPTION

Embodiments of the disclosed subject matter can provide techniques for producing one or more forecasts using various forecasting techniques or algorithms and, based on the forecasts, calculating and executing an optimal dispatch schedule for controlling the operation of one or more energy storage systems and compensating for real-time forecast uncertainty in between schedule updates, all on a rolling basis. Embodiments of the disclosed subject matter can also provide techniques for calculating optimal economic dispatch across all possible futures and determining a statistically optimal dispatch schedule for controlling the operation of one or more ESS systems. Embodiments of the disclosed subject matter can also provide techniques for calculating and executing optimal ESS dispatch schedule on an ongoing basis and compensating for forecast uncertainty. Embodiments of the disclosed subject matter can also use parallel processing to speed up computations for forecasts and/or dispatch schedules. Embodiments of the disclosed subject matter can also relate to systems and methods providing technical solutions that are capable of achieving one or more or any possible combination of the following technological objectives: (1) optimal performance in ongoing future prediction of ESS parameters, such as electrical quantities, that affect ESS configuration and operation; (2) quantification of forecast uncertainty and provision for adequate remediation strategies; and (3) scheduling and dispatching an ESS adaptively to track dynamic and evolving ESS parameters, such as electrical parameters. Other embodiments are within the scope of the present invention.

As used herein, the term "dispatch" refers to commanding an ESS control system into a closed-loop or open-loop mode and setting the appropriate mode parameters. For example, the mode may be "charge" and the mode parameter may be "100 kW" in another, more complex example, the mode may be "peak shaving" and the mode parameter may be "1.5 MW maximum net load as measured at substation X."

Figure 1:
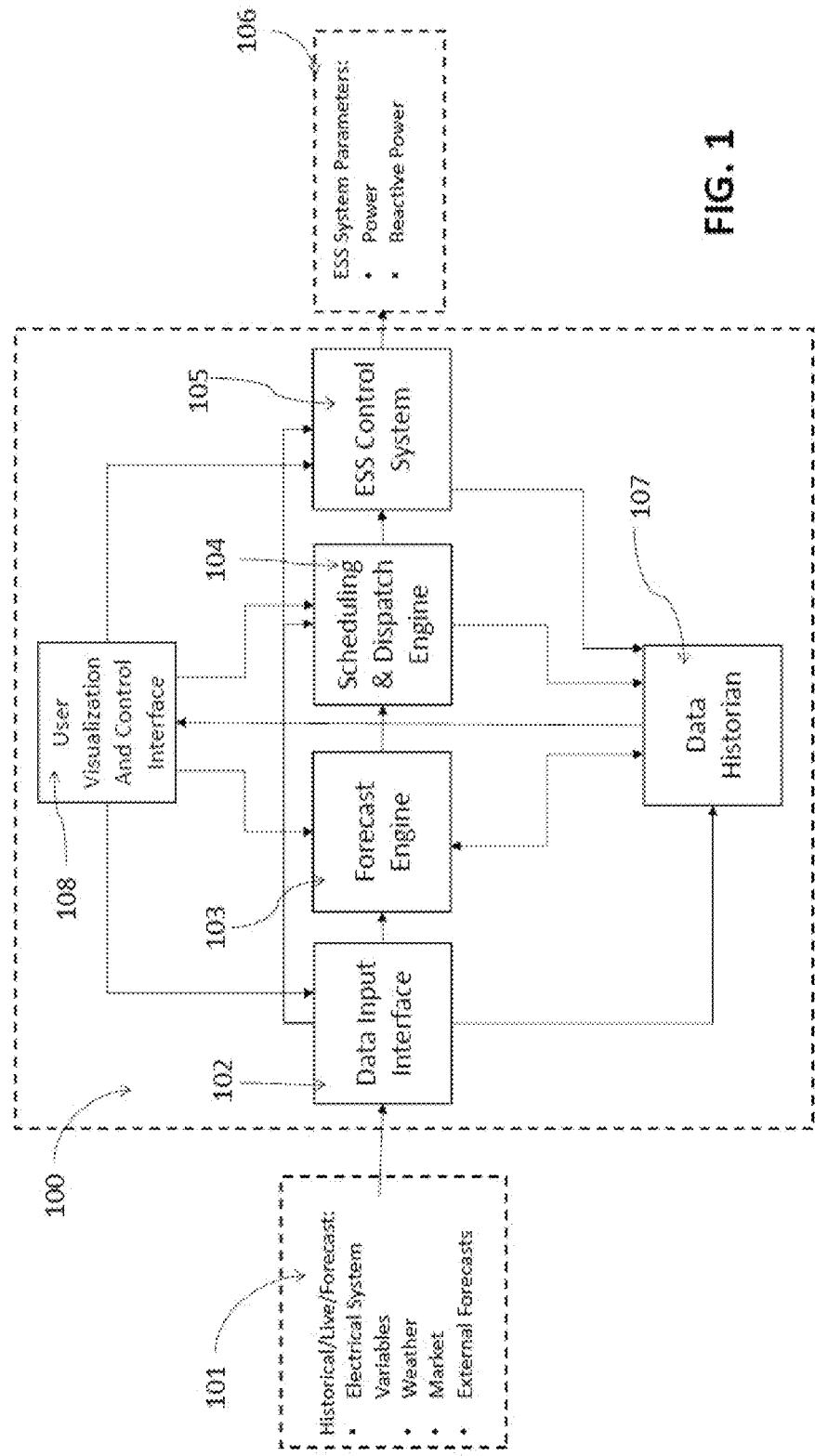
FIG. 1 is a schematic diagram of a system for generating an optimized dispatch schedule for an ESS in accordance with an exemplary embodiment of the present invention.

FIG. 1 shows general components of a system 100 for generating an optimized dispatch schedule for one or more energy storage systems (e.g., multiple ESSs or ESS systems) in accordance with an exemplary embodiment of the present invention. Each component of the system 100 may be implemented in the form of software and/or hardware in one or more local, cloud, and/or hybrid servers and/or one or more local, cloud, and/or hybrid data stores. For example, a data store may include a database managed by a database management system and/or a data file managed by a file system. A variety of data sources 101, which may comprise one or more data stores, may be made available for the system 100 to use. They may include historical, live, and/or forecast data and may also include duplicate data for data integrity and cleaning purposes. Data provided by the data sources 101 to the system 100 may include quantifiable factors that can have an effect on the overall operation of an ESS, such as electrical system variables, market data, weather data and forecasts, to name a few.

The system 100 may receive and collect all relevant data from the data sources 101 through a Data input Interface 102. The Data. Input Interface 102 may be implemented in one or more local, cloud, and/or hybrid servers and/or a special communication interface hardware communicably coupled to the data sources 101. The Data Input Interface 102 is configured to route data feeds received from data source 101 to various components of the system 100 that may require such data feeds. The Data Input Interface 102 may be configured to continually scan and collect new data as soon as it becomes available from the data sources 101. Alternatively, the Data Input Interface 102 may be configured to scan and collect new data from the data sources 101 periodically, on a non-periodic fixed schedule, or on an as-needed basis.

A Forecast Engine 103 may be implemented in the form of software and/or hardware in one or more local, cloud, and/or hybrid servers and may be communicatively coupled to, among others, the Data Input Interface 102 and a Data Historian 107, which is further described below. The Forecast Engine 103 may comprise one or more processors that use data collected from the Data Input Interface 103 and Data Historian 107 to generate a forecast for any value that is needed by a Scheduling and Dispatch Engine 104. The forecast generated by the Forecast Engine 103 may include any possible parameter such as grid net load, renewable generation, non-renewable generation, market pricing, customer load, to name a few. The Forecast Engine 103 may be configured to generate a new forecast as soon as new relevant data is available from the data sources 101 and received by the Data Input Interface 102. In alternative embodiments, the Forecast Engine 103 may be configured to generate a new forecast periodically, on a fixed schedule, or on an as-needed manually controlled basis.

The Scheduling and Dispatch Engine 104 may be implemented in the form of software and/or hardware in one or more local, cloud, and/or hybrid servers and may be communicably coupled to the Forecast Engine 103 as well as the Data Input Interface 102. The Scheduling and Dispatch Engine 104 is configured to take various forecasts available from the Forecast Engine 103. Through a variety of optimization methods, some of which will be described below, the Scheduling and Dispatch Engine 104 determines a dispatch schedule for the ESS. The dispatch schedule generated by the Scheduling and Dispatch Engine 104 may be configured to accomplish one or more technical objectives (e.g., operational optimization, financial optimization, environmental optimization, to name a few) that may be preset by the Scheduling and Dispatch Engine 104 or manually set by a request from a human operator (which is, for example, entered through a User Visualization and Control Interface 108 to be described below) before each generation of a dispatch schedule. In embodiments, the technical objectives to be accomplished by the Scheduling and Dispatch Engine 104 may include optimization of one or more ES applications, such as (i) provision of certain ancillary services for which there are established energy or capacity market mechanisms (e.g., frequency regulation, spinning reserves, black start capacity), (ii) load shifting or peak shaving, (iii) deferral or avoidance of otherwise necessary transmission or distribution upgrades, (iv) relief of transmission or distribution bottlenecks or other constraints, (v) integration of intermittent renewable generation, whether through smoothing, ramping services, the provision of shaped power, or otherwise, (vi) hybridization of generation assets to increase fuel efficiency or reduce carbon emissions, (vii) provision of backup power or UPS during islanded operation, (viii) time shifting of energy purchases and sales for cost saving or arbitrage purposes, (ix) provision (or committed availability to provide) of various operating reserves, (x) provision of power, energy or services that might otherwise be provided by a natural gas peaking plant or other power generation sources, to name a few.

In embodiments, optimization by the Scheduling and Dispatch Engine 104 is not necessarily limited to a single variable. The Scheduling and Dispatch Engine 104 may have a set of multiple variables which can all be combined to create an overall cost function for optimization (e.g., minimization). For example, the cost function may include the cost of monthly or yearly peak load, the cost of energy at different times of the day, the cost of energy from different sources (grid vs. solar vs. wind, etc.), the cost of cycling the ESS, the cost (or revenue) of being available to the grid operator for a certain task (e.g., ramp rate control or demand response), to name a few. Components of the cost function may vary significantly from application to application. The Scheduling and Dispatch Engine 104 may be configured to find the optimal compromise between all of the individual components of the cost function in order to optimize (e.g., minimize) it as a whole.

The Scheduling and Dispatch Engine 104 is configured to transmit the dispatch schedule to an ESS Control System 105 as commands for execution by the ESS Control System 105 to control the ESS accordingly. The Scheduling and Dispatch Engine 104 may be configured to generate a new dispatch schedule for the ESS as soon as new relevant data becomes available (e.g., a new forecast from the Forecast Engine 104 and/or new live data available from the data sources 101 and received by the Data Input Interface 102), on a fixed schedule, or on an as-needed manually controlled basis (e.g., controlled through a User Visualization and Control Interface 108).

The ESS Control System 105 may be implemented in the form of software and/or hardware in one or more local, cloud, and/or hybrid servers and may be communicably coupled to the Scheduling and Dispatch Engine 104 and the Data input Interface 102. Based on the dispatch schedule received from the Scheduling and Dispatch Engine 104, combined with the live data feeds received from the Data Input Interface 102, the ESS Control System 105 may determine ESS System Parameters, such as real power and reactive power, for controlling the ESS 106. For example, the Scheduling and Dispatch Engine 104 may give direction to the ESS Control System 105 in the form of a simple goal (e.g., maintaining a net grid load under a certain threshold) that can be achieved through high-speed "closed-loop" control. In this exemplary embodiment, the ESS Control System 105 may be configured to react as soon as any new value (e.g., a change in the net grid load) is available but without having any new information from the Scheduling and Dispatch Engine 104. In another example, the ESS Control System 105 may operate in an "open-loop" scenario where the Scheduling and Dispatch Engine 104 commands the ESS Control System 105 to output a fixed power and ignore any other inputs, Depending on the overall application, either or both of these "open loop" and "closed loop" modes may be used.

For example, based on the dispatch schedule received from the Scheduling and Dispatch Engine 104, combined with the live data feeds received from the Data Input Interface 102, the ESS Control System 105 may determine ESS System Parameters, such as real power and reactive power to input or extract from a grid or a microgrid. These ESS System Parameters may be sent to the battery systems (e.g., inverters and battery management controllers) in order to command how much real and reactive power is being input or extracted from the grid or microgrid.

The Data Historian 107 may be implemented in one or more data stores stored in one or more local, cloud, and/or hybrid servers and, as shown in FIG. 1, may be communicably coupled to the Data Input Interface 102, Forecast Engine 103, Scheduling and Dispatch Engine 104 and/or ESS Control System 105. The Data Historian 107 may be configured to collect, store and manage data that is received from these and possibly other components of the system 100, and may further record relevant meta-data (e.g., time record) associated with each piece of information it receives and stores. The Data Historian 107 may also be configured to supply historical datasets to various components of the system 100, such as the Forecast Engine 103 and User Visualization and Control interface 108 (which is further described below). In embodiments, the Data Historian 107 may be configured to collect and store various types and forms of data, including both controlled and uncontrolled variables, numeric data, textual data, audio data, image data, video data, to name a few.

In embodiments, the Data Input Interface 102 may be configured to scan and collect new data from the data sources 101 in a manner (e.g., on an as-needed basis) that is compatible with the need and configuration of the Data Historian 107. In this way, large historical datasets can be downloaded to and integrated in the Data Historian 107.

The User Visualization and Control Interface 108 may be implemented in the form of software and/or hardware in one or more local, cloud, and/or hybrid servers that is communicably coupled to at least one display device, such as LCD monitor, touch screen, smart phone, tablet PC, to name a few. The display device may be configured to display a graphical user interface. As shown in FIG. 1, the User Visualization and Control interface 108 may be communicably coupled to the Data. Input Interface 102, Forecast Engine 103, Scheduling and Dispatch Engine 104, ESS Control System 105 and/or Data Historian 107. In embodiments, the User Visualization and Control Interface 108 may be configured to allow a human operator to monitor both the current and historical performance and state of some or all of the components of the system 100 or the entire system 100. In embodiments, the User Visualization and Control Interface 108 may be implemented via a web-based tool, such as graphical user interface displayed on a display device connected to the Internet, which is configured to provide easy access to well-curated data sets as well as more universal access to any data stored in the Data Historian 107. In embodiments, the User Visualization and Control interface 108 may be configured to send manual controls to any of the components of the system 100 in order to control such behaviors as execution timing, decision overriding, to name a few.

Figure 2:
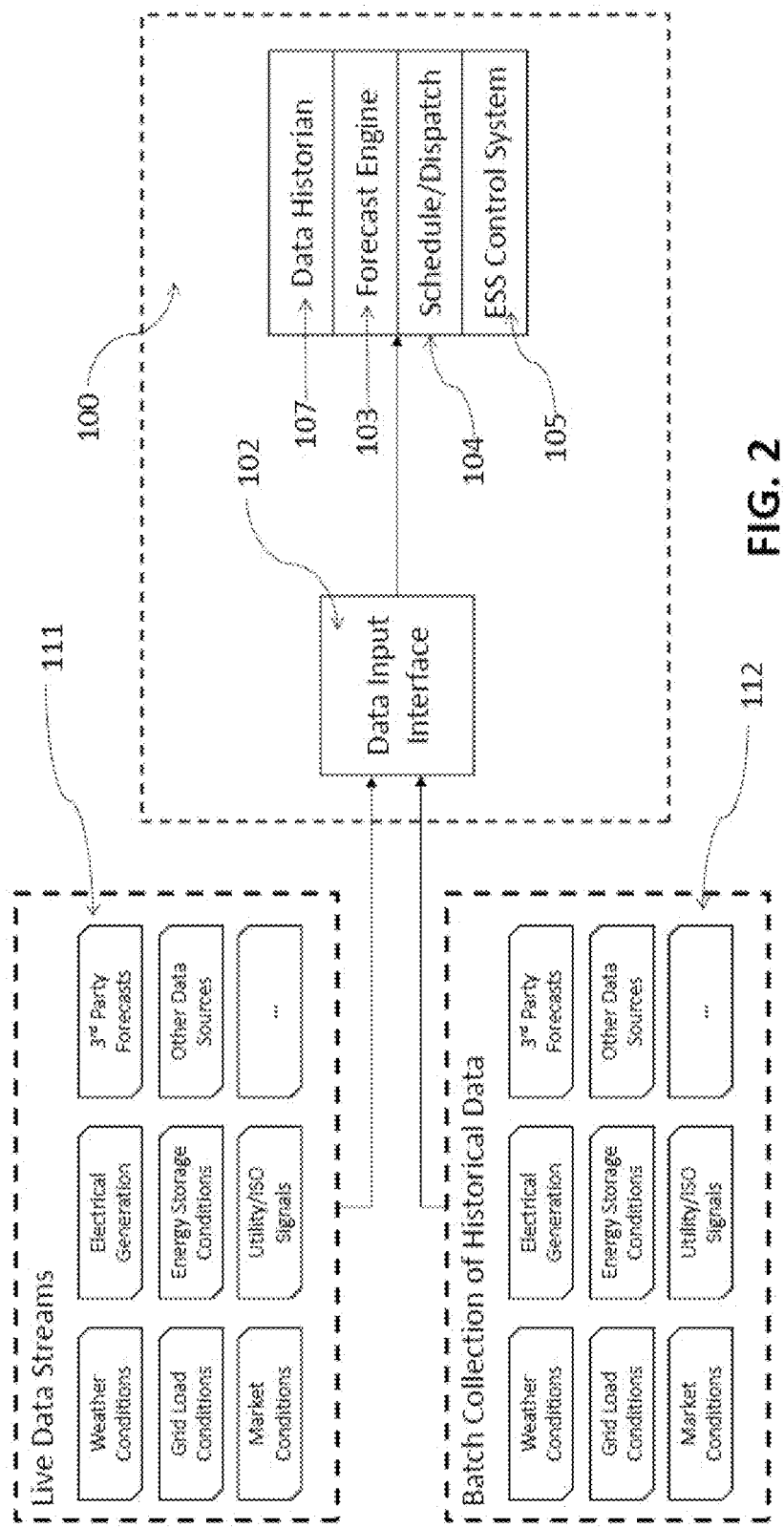
FIG. 2 is a schematic diagram of exemplary data sources for the system of FIG. 1 in accordance with an exemplary embodiment of the present invention.

FIG. 2 shows a schematic diagram of data sources that may be made available to the system 100 of FIG. 1 through the Data Input Interface 102 in accordance with an exemplary embodiment of the present invention. Possible data sources include live data streams 111, batch collection of historical data 112, to name a few. Live data streams 111 may include any possible data source, either internal to the ESS, internal to the grid or micro-grid, or publicly available via the Internet or other public data feed, proprietary non-public third-party data feeds, to name a few. In embodiments, these data feeds may be configured to be automatically or manually entered with preference to automatic data collection and connections. In embodiments, these data feeds may include third party forecasts for comparison and aggregation in the Forecast Engine 103. Interfaces in the Data Input Interface 102 that are used to collect live data streams 111 may include any suitable protocol or data format such as: flat file, web services, REST api, MODBUS, DNP3, HTTP, FTP, XML, JSON, to name a few.

Batch collection of historical data 112 involves locating and collecting a historical data record of one or more of the live data streams. These may come from proprietary or public data sources and may be duplicated for data verification and cleaning. Interfaces in the Data Input Interface 102 that are used to collect historical data sets may include any suitable protocol or data format such as: flat file, web services, REST api, MODBUS, DNP3, HTTP, FTP, XML, JSON, to name a few.

The Data Input Interface 102 may be configured to collect incoming data from data sources such as live data streams 111 and/or batch collection of historical data 112. In embodiments, the Data Input Interface 102 may be further configured to verify, clean, and/or detect and add any missing meta data to the incoming data to ensure that the received data is accurate and in the correct format to pass on to any subsequent components in the system 100. The Data input Interface 102 may be configured to process streaming data as it becomes available, execute a routine on at a preset or variable time interval, or manually triggered to process the incoming data. In embodiments, the Data Input Interface 102 may also be configured to communicate to downstream components in the system 100 that a previously passed piece of data is either no longer valid or has been replaced with a newer piece of data.

In embodiments, such as the exemplary embodiments shown in FIGS. 1 and 2, the Data Historian 107, Forecast Engine 103, Scheduling and Dispatch Engine 104 and ESS Control System 105 may be configured to receive data and data streams directly from the Data Input interface 102. In embodiments, data feeds may be sent to each of these components of system 100 at a fixed or variable frequency or at a frequency set by a request from the component.

Figure 3:
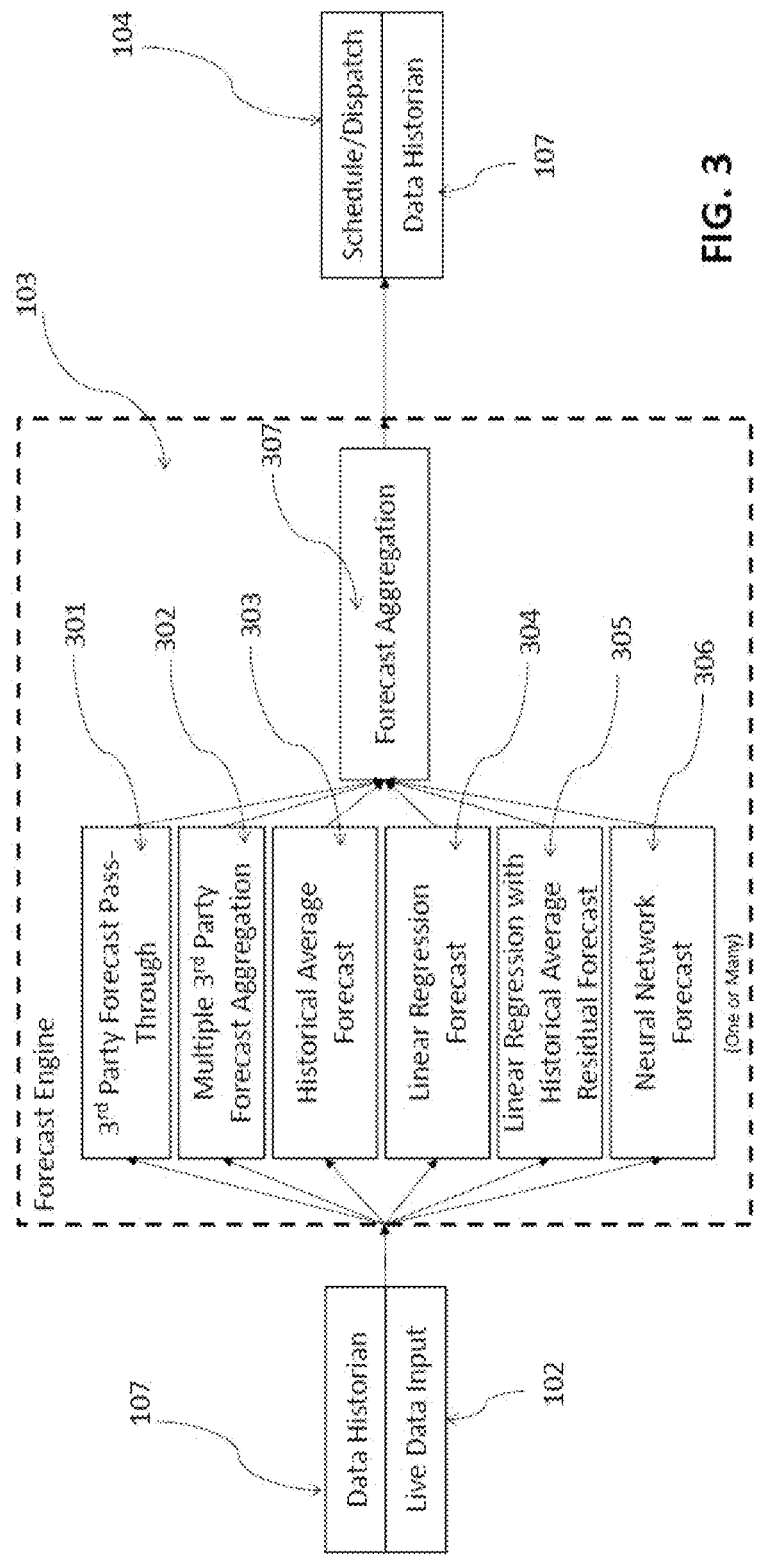
FIG. 3 is a schematic diagram of a Forecast Engine in accordance with an exemplary embodiment of the present invention.

FIG. 3 shows a schematic diagram of an exemplary embodiment of Forecast Engine 103 in the system 100 of FIG. 1. In this exemplary embodiment, the Forecast Engine 103 is configured to receive up-to-date live data streams from the Data Input Interface 102 and also to query the Data Historian 107 for historical data sets.

Various possible forecasting methods and algorithms may be used by the Forecast Engine 103. Each forecasting method/algorithm can be used to generate a forecast based on input data and may also be configured to calculate related statistical measurements such as a forecast confidence, forecast uncertainty metric, to name a few. In embodiments, the Forecast Engine 103 may be configured to use several forecasting algorithms individually and/or in combination. FIG. 3 shows one such example of the Forecast Engine 103 using the following forecast methods/algorithms individually and/or in combination: Third Party Forecast Pass-Through technique 301, Multiple Third Party Forecast Aggregation technique 302, Historical Average Forecast technique 303, Linear Regression Forecast technique 304, Linear Regression with Historical Average Residual Forecast technique 305 and Neural Network Forecast technique 306.

The Third Party Forecast Pass-through technique 301 uses a forecast received from one or more external sources as-is.

The Multiple Third Party Forecast Aggregation technique 302 collects multiple third party forecasts received from one or more external sources and aggregates them. This aggregation may be through a weighted averaging, a time or condition variable weighted averaging, a neural network weighting, or some other suitable aggregation method.

The Historical Average Forecast technique 303 calculates future values by calculating a weighted average of past values while keeping certain variable parameters constant. For example, the Historical Average Forecast technique 303 may calculate a future load as the 2-week historical average of the load during the same hour of the same type of date (e.g., weekday or holiday). The variable parameters that are kept constant during the calculation of future values may include time ranges, day types, temperature ranges, weather condition ranges, time ranges since sunrise, and/or event conditions, to name a few.

The Linear Regression Forecast technique 304 calculates future values by creating a single or multi-variable linear model of one or many input parameters or forecast input parameters. For example, grid load may be a function of temperature and other weather conditions and future load may be calculated by calculating a linear model based on forecast values of those weather conditions.

The Linear Regression with Historical Average Residual Forecast technique 305 is based at least in part on a combination of the Historical Average Forecast method 303 and the Linear Regression Forecast method 304 in that it calculates future values by first normalizing historical values based on a single or multi-variable linear model and then utilizing a historical average approach to take advantage of the periodicity of the remaining signal with respect to other parameters. Then, by utilizing forecasts for the variables used in the linear model, future values may be more accurately calculated. For example, one may create a linear regression model of grid load data as a function of temperature. When applied historically, the residual error of this model can be a periodic function to which historical average forecasting may be applied to predict future residual error. By applying this linear regression model, one may normalize historical grid load data to temperature, and, by using a hour-of-day and day-type historical average of temperature normalized grid load, predict future grid load with forecast temperature.

The Neural Network Forecast technique 306 calculates future values by taking any combination of input variables. Any neural network architecture may be utilized in this method as the forecast problem is a supervised regression problem of predicting a continuous output based on a set of training data that both inputs and outputs for a large historical dataset. Exemplary neural network architectures used in this method may include, but are not limited to, feedforward networks, recursive networks, recursive networks with external inputs, recurrent neural networks (RNNs), such as long short-term memory (LSTM) networks, gated recurrent units (GRUs), Sequence-to-Sequence Learning, to name a few. For example, one may construct and train a recursive neural network that has as input the current and 15 previous time steps of electrical grid load, temperature, dew point, as well as the 24-hour forecast for temperature and dew point. The recursive neural network may produce as output a 24-hour forecast for electrical grid load.

One or many of the internally generated forecasts (e.g., generated by the Third Party Forecast Pass-Through technique 301, Multiple Third Party Forecast Aggregation technique 302, Historical Average Forecast technique 303, Linear Regression Forecast technique 304, Linear Regression with Historical Average Residual Forecast technique 305, and/or Neural Network Forecast technique 306) may be aggregated together by Forecast Aggregation 307 using an averaging, weighted averaging, time-variable weighted averaging, condition variable weighted average, neural network, or any other possible method of aggregation with the goal of improving ultimate forecast accuracy. In embodiments, the Forecast Aggregation 307 may be configured to combine forecast uncertainties respectively associated with the aggregated forecasts in order to give a final estimate of the accuracy of the ultimate forecast generated by the Forecast Engine 103.

Forecast and forecast uncertainty generated by the Forecast Engine 103 is then passed to the Schedule and Dispatch Engine 104. The forecast and forecast uncertainty may also be passed to the Data Historian 107 for storage and analysis.

Figure 4:
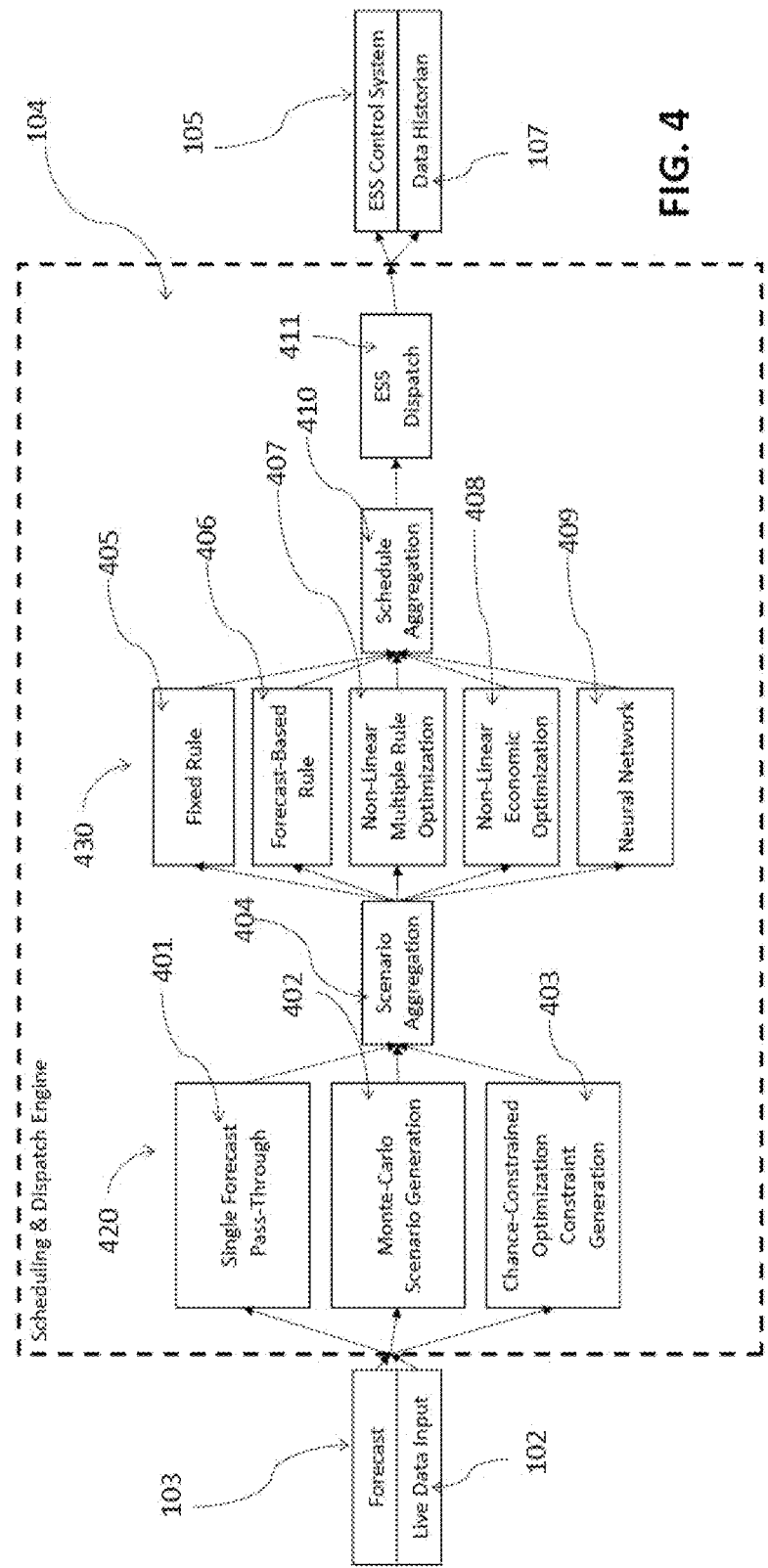
FIG. 4 is a schematic diagram of a Scheduling and Dispatch Engine in accordance with an exemplary embodiment of the present invention.

FIG. 4 shows a schematic diagram of an exemplary embodiment of Scheduling and Dispatch Engine 104 in the system 100 of FIG. 1. In this exemplary embodiment, inputs to the Scheduling and Dispatch Engine 104 may include the forecast provided from the Forecast Engine 103 as well as any relevant live data, which may have changed since the last forecast was calculated, provided from the data sources 101 through the Data Input Interface 102.

The Scheduling and Dispatch Engine 104 may comprise an input layer 420 configured to deal with the forecast uncertainty associated with the forecast provided from the Forecast Engine 103. For example, the input layer 420 may include various techniques/algorithms, such as Single Forecast Pass-Through technique 401, Monte-Carlo Scenario Generation technique 402 and Chance-Constrained Optimization Constraint Generation technique 403 as shown in FIG. 4.

The Single Forecast Pass-Through technique 401 is configured to simply pass the received forecast and forecast uncertainty, without further processing or calculation, to a Scenario Aggregator 404 (which is further described below).

The Monte-Carlo Scenario Generation technique 402 creates a configurable number of possible future scenarios based on the base forecast and forecast uncertainty received from the Forecast Engine 103. This multitude of forecasts is then passed to the Scenario Aggregator 404.

The Chance Constrained Optimization Constraint Generation technique 403 uses a chance-constraint algorithm to create stochastic system constraints (e.g., state of charge or maximum power), which are then passed to the Scenario Aggregator 404. For example, ESS dispatch can be a function of the difference between load and renewable generation. If one assumes that electrical load or renewable generation forecast could achieve 90% accuracy, this assumption implies that the best forecast of each quantity could be 10% off and the forecast of the difference between the two could be 20% off. In that case, the power requirements of ESS can only be predicated within a +/−20% window and appropriate reserves must be allocated. In this example, a chance constraint algorithm can be used to rigorously calculate the statistically optimal amount of reserves.

The Scenario Aggregator 404 in the Scheduling and Dispatch Engine 104 may take one or more sets of forecast scenarios generated by, for example, the Single Forecast Pass-Through technique 401, Monte-Carlo Scenario Generation technique 402, and/or Chance-Constrained Optimization Constraint Generation technique 403 and pass them on to optimization blocks 430. For example, the Scenario Aggregator 404 may take the original base forecast from the Single Forecast Pass-Through 401 and a configurable subset of the Monte-Carlo scenarios from the Monte-Carlo Scenario Generator 402 and pass them to the optimization blocks 430.

The optimization blocks 430 may use many different optimization methods for the actual system modeling and optimization. Some methods may be more well suited to certain conditions than others. For example, a simpler optimization method may be more robust to forecast uncertainty and may perform better when a high degree of uncertainty is present. On the other hand, a more complex optimization method may perform better when forecast accuracy is estimated to be high. In embodiments, optimization methods may be configured to model more or less complex versions of the ESS Control System 105 (see, e.g., FIG. 1) in order to take advantage of different modes of operations or functionalities that are available. For example, if the ESS Control System 105 is only capable of simple open-loop power output, the Scheduling and Dispatch Engine 104 may necessarily be configured to generate a dispatch schedule (e.g., power output or input at specific time steps in this case) which can optimize (e.g., minimize) the overall cost function given this constraint in terms of timing and accuracy. On the other hand, if the ESS Control System 105 includes more advanced closed-loop operational modes, such as peak shaving or load levelling mode (further discussed below in connection with FIG. 5), then the Scheduling and Dispatch Engine 104 may be able to achieve a better result by designing a dispatch schedule that dictates electrical grid load maximum threshold at various time steps (e.g., a target maximum net load that the ESS may attempt to maintain by discharging as needed). This may allow the ESS to manage the output power of the system much more efficiently.

For example, the optimization blocks 430 may use various optimization methods/algorithms for creating dispatch schedules, such as Fixed Rule Scheduler 405, Forecast-Based Rule Scheduler 406, Non-Linear Multiple Rule Optimization Scheduler 407, Non-Linear Economic Optimization Scheduler 408 and Neural Network Scheduler 409, as shown in FIG. 4. The Fixed Rule Scheduler 405 takes no input from the received forecast scenario and creates a dispatch schedule based on fixed configurable parameters. For example, the Fixed Rule Scheduler 405 may generate a dispatch schedule prescribing a discharge of the ESS between 3 PM and 7 PM in the afternoon and a charge of the ESS between 9 AM and 1 PM.

The Forecast-Based Rule Scheduler 406 may take a limited subset of forecast features in order to improve on the Fixed Rule Scheduler 405. For example, the Forecast-Based Rule Scheduler 406 may use the forecasted peak hour to time the discharge window to be more accurately aligned with the peak load.

The Non-Linear Multiple Rule Optimization Scheduler 407 seeks to maximize a goal function of interest to ESS asset owner. For example, the goal function of interest to a transmission and distribution electrical utility can be the maximum of the electrical load at a transmission or distribution node in a year. In this representative application, the ESS can shave nodal load optimally with given ESS power and energy capacity. In embodiments, the Non-Linear Multiple Rule Optimization Scheduler 407 may be restricted from violating any of the defined and configurable constraints (e.g., the energy and power limits within which ESS asset can safely operate by manufacturer's specifications). This approach may be executed using any of the possible forecast scenario sets. In alternative embodiments, the Non-Linear Multiple Rule Optimization Scheduler 407 may use either a multiple pass Monte-Carlo Scenario Generation technique 402, which generates a multitude of possible dispatch schedules, or a single-pass Chance Constrained Optimization Constraint Generation technique 403, which uses stochastic constraints to generate a single optimal dispatch schedule.

The Non-Linear Economic Optimization Scheduler 408 seeks to minimize a pre-defined cost function of interest to ESS asset owner. For example, the cost function of interest to a renewable electricity producer can be the integral of energy generated and market price paid for that energy. In this representative application, the ESS can move renewable energy in time from periods of low price to periods of high price. In embodiments, the Non-Linear Economic Optimization Scheduler 408 may be restricted from violating any of the defined and configurable constraints (e.g., the energy and power limits within which ESS asset can safely operate by manufacturer's specifications). This approach may be executed using any of the possible forecast scenario sets. In alternative embodiments, the Non-Linear Economic Optimization Scheduler 408 may be configured to use either a multiple pass Monte-Carlo Scenario Generation technique 402, which generates a multitude of possible dispatch schedules, or a single-pass Chance Constrained Optimization Constraint Generation technique 403, which uses stochastic constraints to generate a single optimal dispatch schedule.

The Neural Network Scheduler 409 may take a configurable number of inputs including the forecast, forecast uncertainty and any other inputs deemed useful and then generate a dispatch schedule based on the inputs. For example, a neural network may be designed and trained to accept the current forecast, forecast uncertainty and system state (e.g., ESS state of charge) and output an optimal dispatch schedule for the next 24 hours. This neural network may be trained on historical data by using a reinforcement learning approach with the goal to optimize (e.g., minimize) the cost function as dictated for this specific exemplary embodiment.

One or more dispatch schedules internally generated at the optimization blocks 430 may be aggregated together by a Schedule Aggregation 410 using an averaging, weighted averaging, time-variable weighted averaging, condition variable weighted averaging, neural network, or any other possible method of aggregation with the goal of improving ultimate schedule optimality. The aggregated dispatch schedule is then forwarded to an ESS Dispatch 411.

The ESS Dispatch 411 is configured to receive and store the current dispatch schedule. In embodiments, the ESS Dispatch 411 may also send commands to one or more ESS Control Systems 105 with the correct timing information in order for the dispatch schedule to be correctly executed. In the case where multiple ESS Control Systems 105 are being commanded, the ESS Dispatch 411 may use an average, weighted average, or neural network decision algorithm to determine the distribution of commands to the different ESS Control Systems. In embodiments, the ESS Dispatch 411 may send commands to both the ESS Control System(s) 105 and the Data Historian 107 for performance analysis and visualization.

Figure 5:
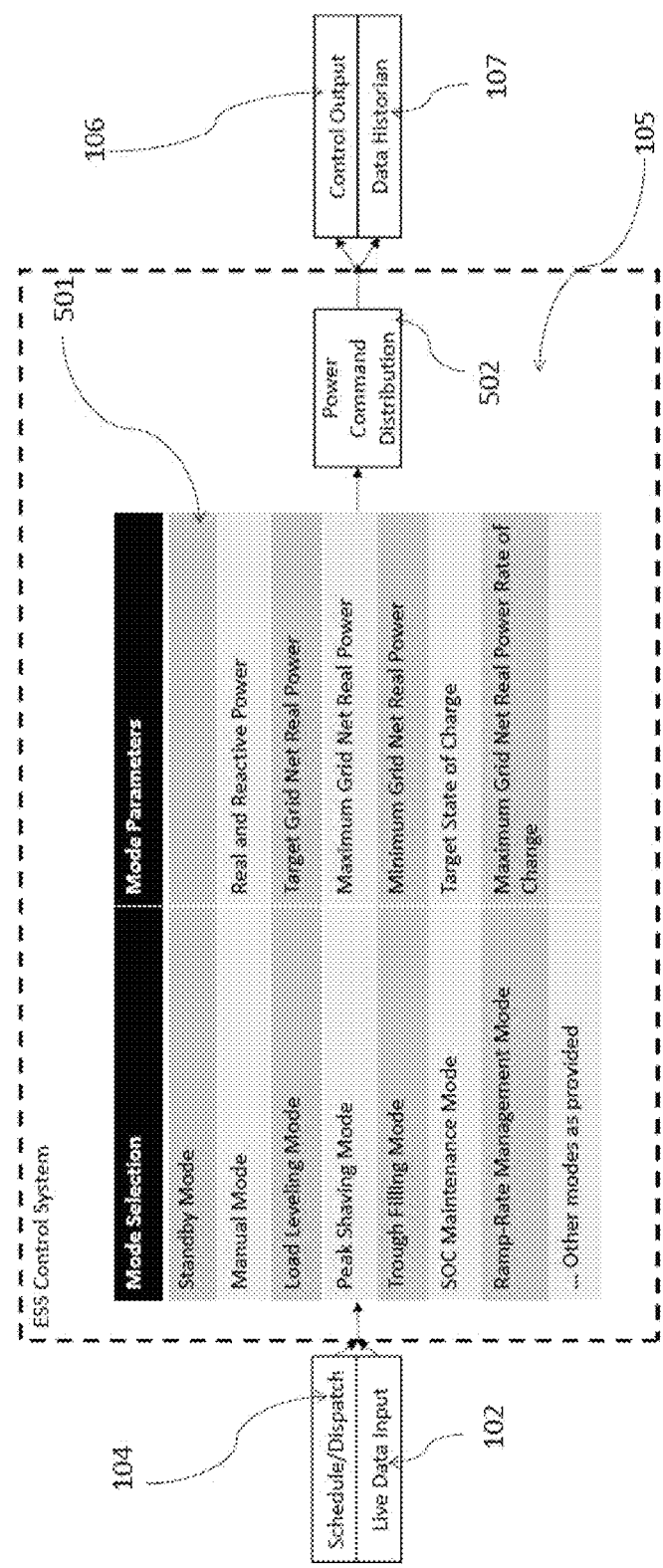
FIG. 5 is a schematic diagram of an ESS Control System in accordance with an exemplary embodiment of the present invention.

FIG. 5 shows a schematic diagram of an exemplary embodiment of the ESS Control System 105 in the system 100 of FIG. 1. In this exemplary embodiment, inputs to the ESS Control System 105 may include the input dispatch schedule provided from the Scheduling and Dispatch Engine 104 and live data feeds provided from the data sources 101 through the Data Input Interface 102.

In embodiments, one or more rule-based modes may be pre-programmed in the ESS Control System 105. The rule-based modes each have a different behavior based on the configured mode parameters. For example, "Peak Shaving Mode" may be a closed-loop mode where the ESS continuously monitors the electrical grid load and discharges only as needed to maintain that net load below a configurable parameter called the "peak shaving threshold." As another example, a simple "Manual Mode" may be an open-loop mode where the ESS charges or discharges at the power level specified by the parameters "real power" and "reactive power."

Different modes and different mode parameters may be selected based on the incoming dispatch schedule being executed by the ESS Control System 105. In embodiments, different modes available for selection by the ESS Control System 105 may include Standby Mode, Manual Mode, Load Leveling Mode, Peak Shaving Mode, Trough Filling Mode, State-of-Charge (SOC) Maintenance Mode, and/or Ramp-rate Management Mode, to name a few. In embodiments, the corresponding mode parameters available for selection by the ESS Control System 105 may include, for example, Real and Reactive Power, Target Grid Net Real Power, Maximum Grid Net Real Power, Minimum Grid Net Real Power, Target State of Charge, and/or Maximum Grid Net Real Power Rate of Change, to name a few.

The Standby Mode has no corresponding mode parameters. In this mode, the ESS does not charge or discharge.

The mode parameters for the Manual Mode may include Real Power and Reactive Power. In the Manual Mode, the ESS charges (or discharges) at the power level indicated by Real Power and Reactive Power.

The mode parameters for the Load Leveling Mode may include Target Load. In the Load Leveling Mode, the ESS monitors the net electrical grid load and charges or discharges in order to maintain that value as close to the Target Load as possible.

The mode parameters for the Peak Shaving Mode may include Peak Shaving Threshold. In the Peak Shaving Mode, the ESS monitors the net electrical grid load and discharges as needed in order to maintain that value below or equal to the Peak Shaving Threshold.

The mode parameters for the Trough Filling Mode may include Trough Filling Threshold. In the Trough Filling Mode, the ESS monitors the net electrical grid load and charges as needed in order to maintain that value greater than or equal to the Trough Filling Threshold.

The mode parameters for the SOC Maintenance Mode may include Target SOC and Maximum Power. In the SOC Maintenance Mode, the ESS continually monitors the current energy storage state of charge and charges or discharges at a power level less than or equal to the Maximum Power in order to stay as close to the Target SOC as possible.

The mode parameters for the Ramp Rate Management Mode may include Maximum Ramp Rate. In the Ramp Rate Management Mode, the ESS continually monitors the net electrical grid load rate of change (ramp rate) and charges or discharges as needed to maintain the ramp rate less than or equal to the Maximum Ramp Rate.

The ESS Control System 105 may execute the incoming dispatch schedule in an open-loop or closed-loop configuration. In the open-loop configuration, the dispatch schedule is followed without any reaction to other feedback variables. Feedback variables may include electrical grid net load, electrical grid net load rate of change, and/or current ESS SOC, to name a few. In the closed-loop configuration, the ESS Control System 105 reacts to feedback variables as they arrive, for example, on a second or sub-second periodicity.

In embodiments (not shown in FIG. 5), other closed-loop control modes may be available for selection by the ESS Control System 105. Such closed-loop control modes may include Export-Limiting Mode, Export-Maximizing Mode, Export-Smoothing Mode, Import-Limited Mode, and/or Grid-Support Mode, to name a few.

For example, when an ESS is paired with a variable generator (e.g., solar generator), and the power output of the combined facility is limited by agreement with the utility or by hardware power limitations, the ESS may be configured under the Export-Limiting Mode to charge only if the output of the variable generator gets too high, thereby maintaining the net output of the combined facility below the maximum.

In another example, when an ESS is paired with a variable generator (e.g., solar generator), and the power output of the combined facility is limited by agreement with the utility or by hardware power limitations, the ESS may be configured under the Export-Maximizing Mode to discharge only if the output of the variable generator falls below the maximum, thereby maintaining the net output of the combined facility as close to the maximum as possible.

In yet another example, when an ESS is paired with a variable generator (e.g., solar generator), and the power output of the combined facility is limited by agreement with the utility or by hardware power limitations, the ESS may be configured under the Export-Smoothing Mode to charge or discharge as needed in order to maintain the net power output of the combined facility as close to the maximum as possible.

In yet another example, when an ESS is paired with a variable generator (e.g., solar generator), and the ESS is required to only charge from energy originating from that variable generator and not from the power grid, the ESS may be configured under the Import-Limited Mode to monitor the output of that variable generator and only charge at a power level that is equal to or less than the instantaneous power output of the variable generator.

In another example, if the net load at a substation must remain in a certain band (e.g., 10%-80% of total load), then an ESS may be configured under the Grid-Support Mode to automatically charge or discharge in order to artificially increase or decrease the net load at the substation so as not to fall outside of the required band.

In response to the selection of a mode and mode parameters based on the dispatch schedule being executed, a Power Command Distribution 502 in the ESS Control System 105 may send, for example, Real Power and Reactive Power commands to one or more ESS systems 106 (e.g., inverters, battery management systems, batteries, to name a few). The overall real power and reactive power being commanded by the Power Command Distribution 502 may be split between the available systems by an average or weighted average method and may seek to maintain a pre-determined goal, such as maintaining even state-of-charge across all commanded ESS systems. The Power Command Distribution 502 may utilize any suitable communication protocol or data format such as MODBUS, DNP3, CAN, NMEA0183, to name a few.

Control output signals generated by the ESS Control System 105 may be sent to each of the commanded ESS system(s) 106. The control output signals from the ESS Control System 105 may also be sent to the Data Historian 107 for visualization and performance analysis.

Figure 6:
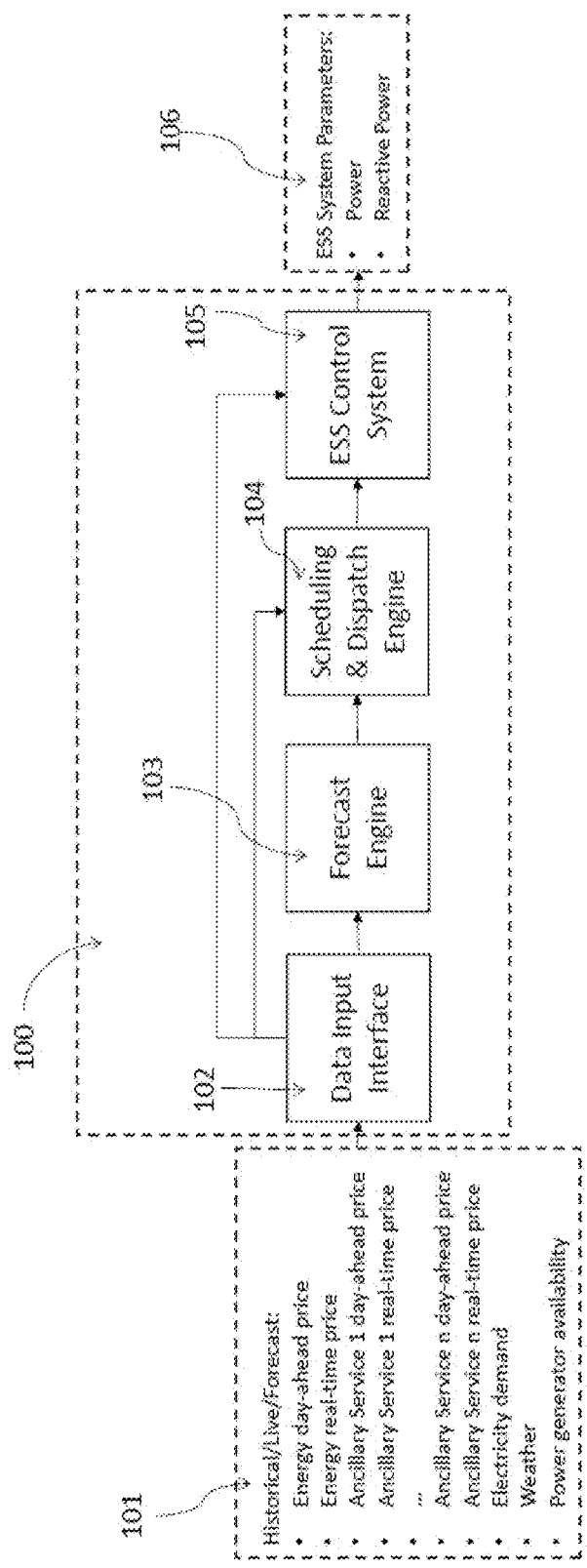
FIG. 6 is a schematic diagram of an exemplary implementation of the system of FIG. 1 in accordance with an exemplary embodiment of the present invention.

The system 100 shown in FIG. 1 for generating an optimized dispatch schedule for one or more ESS systems may be implemented and configured in various ways for various purposes and objectives. FIG. 6 is a schematic diagram illustrating an exemplary implementation of the system 100 of FIG. 1.

In this exemplary embodiment, historical, live and/or forecast data that is made available by the data sources 101 to the system 100 may include, for example, energy and ancillary services prices for day-ahead and real-time markets. The historical, live and/or forecast data in the data sources 101 may also include information about weather, electricity demand, and/or power generator availability, to name a few.

In this exemplary embodiment, the Forecast Engine 103 may be configured to correlate historical load, weather, generator availability and pricing for each of the energy and ancillary services products by means of, for example, neural networks and use ongoing forecast of weather and generator availability to resolve both load and price forecast and forecast uncertainty.

For each time period over which the cost optimization function is executed ("optimization horizon"), which can be, for example, as short as a few minutes and as long as several days, the Forecast Engine 103 may be configured to calculate several market prices, such as day-ahead market price and real-time market price for each hour of each day. In embodiments, day-ahead market price is the price at which power generators are paid for generating electricity that was committed in the day prior to actual delivery. In embodiments, real-time market price is the price at which power generators are paid for generating electricity that was not committed in the day prior but is required in real-time.

Figure 7:
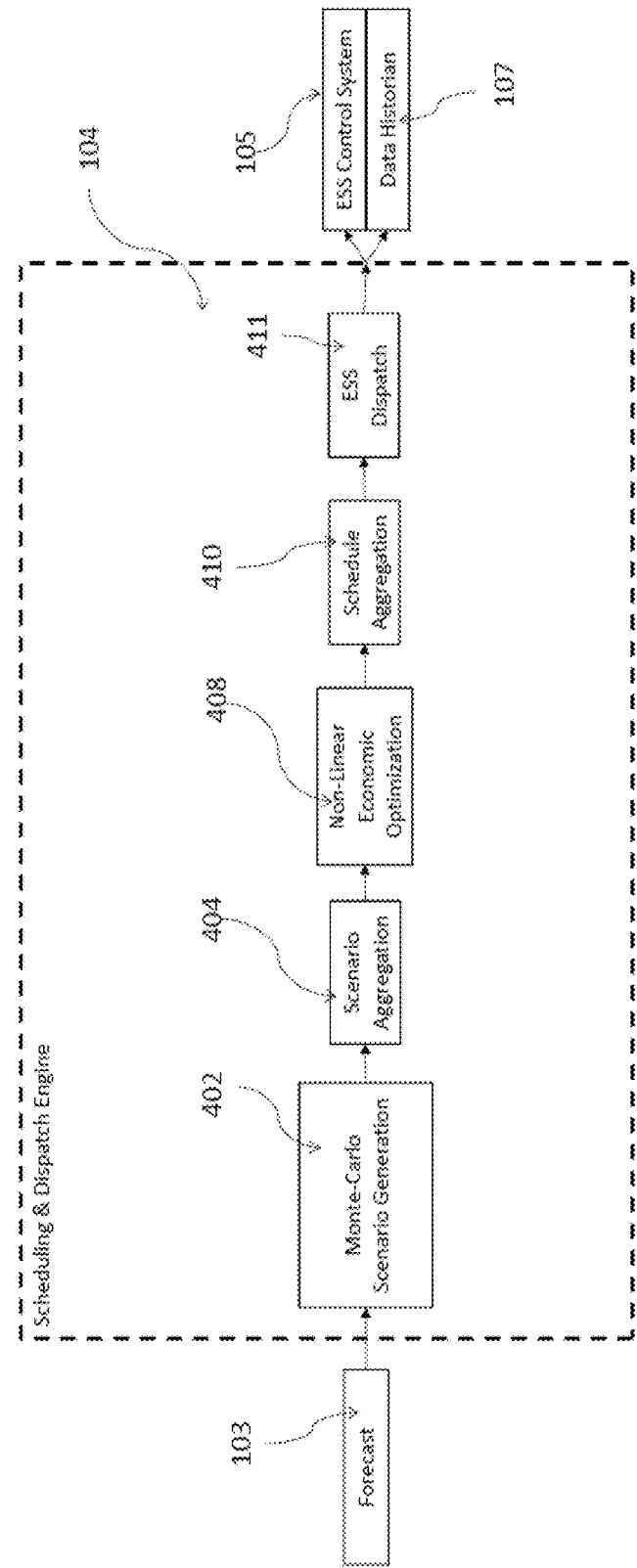
FIG. 7 is a schematic diagram of an exemplary Scheduling and Dispatch Engine implemented in the system of FIG. 6 in accordance with an exemplary embodiment of the present invention.

In this exemplary embodiment, the Scheduling and Dispatch Engine 104 may be configured to use information on future projections of prices of several products in several markets and the corresponding forecast uncertainty to generate an optimal dispatch schedule for an ESS on an ongoing basis, as further described in FIG. 7.

FIG. 7 is a schematic diagram of an exemplary implementation of the Scheduling and Dispatch Engine 104 in the system 100 of FIG. 6. In this exemplary embodiment, the Scheduling and Dispatch Engine 104 uses the Monte Carlo Scenario Generation technique 402 to produce one or more possible forecast scenarios extending over the optimization horizon for each of energy and ancillary services prices and each of day-ahead and real-time markets.

Upon receiving the forecast scenarios from the Monte Carlo Scenario Generator 402, the Scenario Aggregator 404 may down-select some of the scenarios of each of the energy and ancillary services prices. The down selection can occur by choosing energy and ancillary services prices scenarios that are, for example, more similar to one another, more different from one another, or randomly distributed across the population of scenarios. The Scenario Aggregator 404 may also be configured to down-sample each of the price scenarios in order to consider a smaller number of representative scenarios and thereby reduce the number of data points and the dimensionality of the otherwise very complex problem that would require expensive computational resources.

In this exemplary embodiment, the Non-Linear Economic Optimization Scheduler 408 may be used to consider the average forecasted day-ahead and real-time prices and the corresponding uncertainties to optimally allocate fractions of energy storage power and energy resources in the day-ahead and real-time markets. For example, energy storage resources committed in the day-ahead market can be proportional to the ratio of day-ahead to real-time prices and inversely proportional to the ratio of day-ahead to real-time uncertainties. In embodiments, the Non-Linear Economic Optimization Scheduler 408 may be further configured to allocate the resources in each of the day-ahead and real-time markets optimally in order to maximize a value function (see the following example) weighed against all energy and ancillary services products available in that market. For example, energy storage resources scheduled in the day-ahead market can be mostly allocated to energy if energy arbitrage value is substantially higher than the value of ancillary services prices. Optimization of the value function may be accomplished by, for example, a linear or non-linear programming subject to energy storage resource constraints. In embodiments, the Non-Linear Economic Optimization Scheduler 408 may be configured to perform such optimization across all possible combinations of down-selected and down-sampled Monte-Carlo price scenarios of energy and ancillary services so that several Monte-Carlo generated dispatch schedules are produced for each product in each market.

In this exemplary embodiment, the Schedule Aggregator 410 may average several Monte-Carlo dispatch schedules for each product in each market to a single, statistically optimal dispatch schedule for each product in each market, which can be received and stored by the ESS Dispatch 411.

The ESS Dispatch 411 may in turn send commands for execution of the optimal dispatch schedule to the ESS Control System(s) 105 and also to the Data Historian 107 for performance analysis and visualization.

Figure 8:
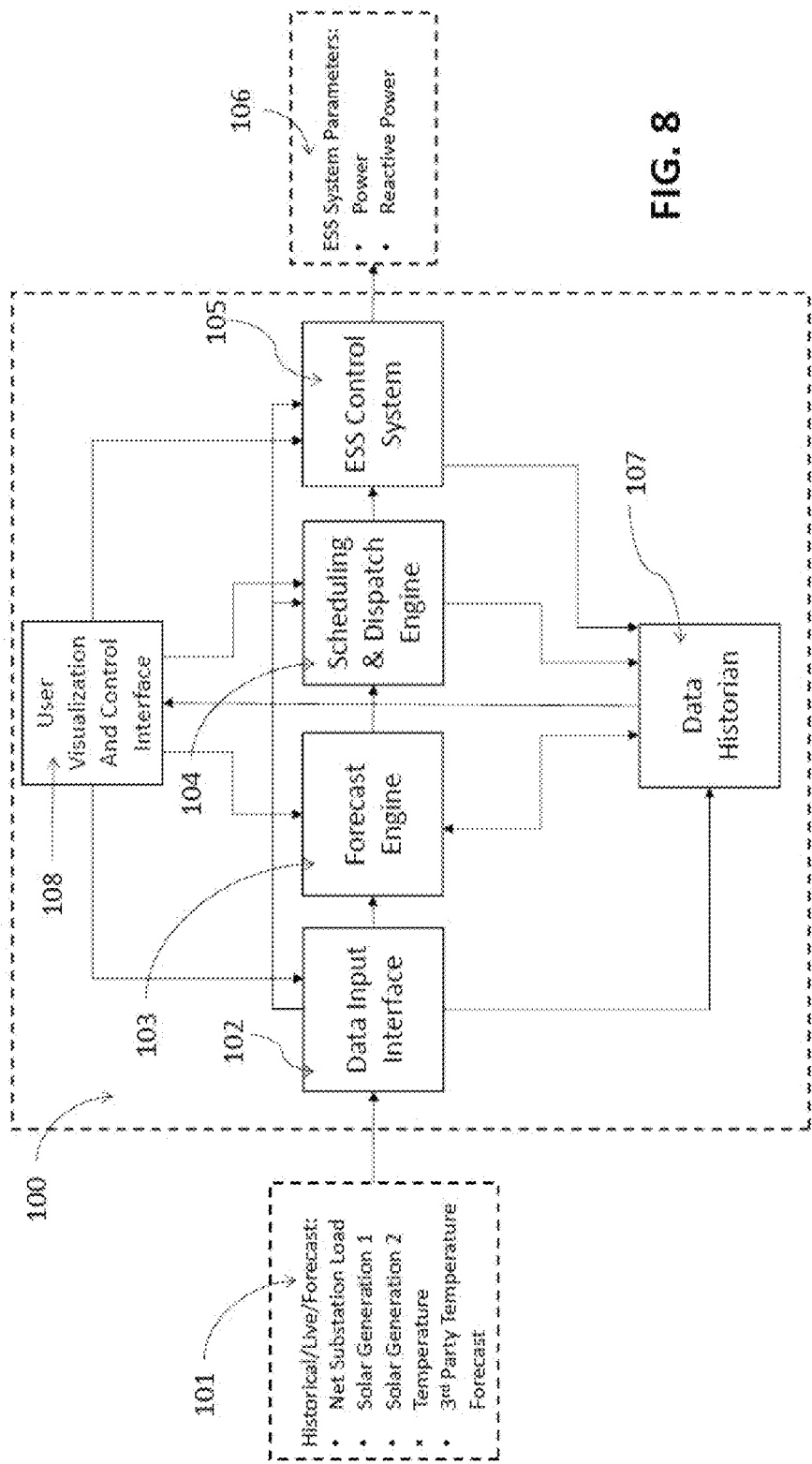
FIG. 8 is a schematic diagram of another exemplary implementation of the system of FIG. 1 in accordance with an exemplary embodiment of the present invention.

FIG. 8 is a schematic diagram of another exemplary implementation of the system of FIG. 1 in accordance with an exemplary embodiment of the present invention. This exemplary implementation relates to solar energy and storage application.

In this exemplary embodiment, a variety of data sources 101, such as net load, solar generation, temperature, temperature forecast, to name a few, may be made available to and read by the Data Input Interface 102. The Data Input Interface 102 may be configured to pass data as it arrives to the Data. Historian 107 for storage and later retrieval and pass the latest data to the Forecast Engine 103.

The Forecast Engine 103 may be configured to receive the new data from the Data Input Interface 102 and then query the Data Historian 107 for a historical data set (e.g., net load, solar generation, temperature, to name a few) as needed by the forecast algorithm. The Forecast Engine 103 processes the incoming and historical data to produce a forecast of, for example, net load and/or solar generation for the Scheduling and Dispatch Engine 104.

The Scheduling and Dispatch Engine 104 may receive the forecast from the Forecast Engine 103 and query the Data Historian 107 for the last known system constraints (e.g., battery available capacity). The Scheduling and Dispatch Engine 104 processes the forecast and system constraints to generate a dispatch schedule, optimizing around a specific goal (e.g., minimizing peak net load), and may store the dispatch schedule both internally and in the Data. Historian 107. The Scheduling and Dispatch Engine 104 may then, as the dispatch schedule and time dictate, pass appropriate commands to the ESS Control System 105 for execution. These commands may include operation mode and operation mode parameters.

Upon receiving the commands from the Scheduling and Dispatch Engine 104, the ESS Control System 105 may communicate the necessary ESS system parameters 106, such as real power, reactive power, to name a few, to the low level controllers in order to execute the dispatch schedule.

Figure 9:
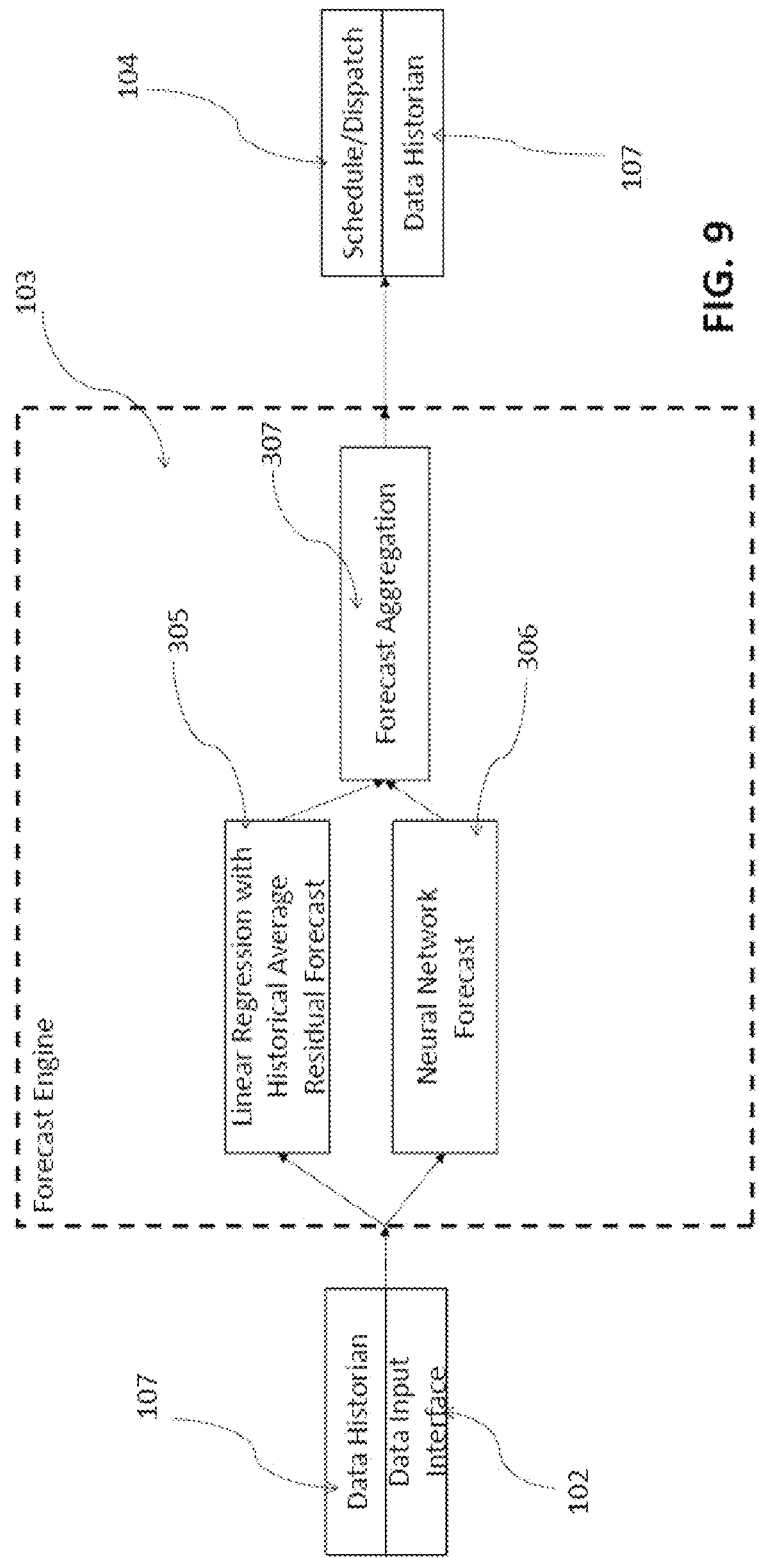
FIG. 9 is a schematic diagram of an exemplary Forecast Engine implemented in the system of FIG. 8 in accordance with an exemplary embodiment of the present invention.

FIG. 9 is a schematic diagram of an exemplary implementation of the Forecast Engine 103 for solar energy and storage application in the system 100 of FIG. 8, in accordance with an exemplary embodiment of the present invention. The Forecast Engine 103 may be configured to receive live data updates from the Data Input Interface 102 and a necessary trailing history comprising the recent historical dataset (e.g., from the last few hours or days) from the Data Historian 107. In this exemplary embodiment, the Forecast Engine 103 may simultaneously run in parallel two forecast algorithms for, for example, Linear Regression with Historical Average Residual Forecast 305 and Neural Network Forecast 306 to create two forecasts.

The Linear Regression with Historical Average Residual Forecast technique 305 creates a linear regression model and combines that with a historical average residual error forecast based on, for example, the hour and type of day. By utilizing the third party temperature forecasts, this model can predict load. A historical averaging forecast may be used to predict solar generation. These load and solar generation forecasts may be combined to generate a net load forecast.

The Neural Network Forecast 306 may be configured to utilize a trained RNN to calculate future load based on the recent historical dataset. This neural network may be trained on an appropriate historical dataset offline. For example, the RNN architecture uses as input a trailing history of the parameter being forecast (e.g., the last 6 hours of load) and uses that to predict the next time-step. Other parameters may also be used in the algorithm such as the last 6 hours of temperature and the current forecast temperature.

The Forecast Aggregation 307 may be configured to receive both net load forecasts generated by the Linear Regression with Historical Average Residual Forecast technique 305 and Neural Network Forecast technique 306. Depending on the historically expected uncertainty in each forecast, the Forecast Aggregation 307 may be configured to select one of the forecasts or averages the forecasts and pass the resulting forecast to the Schedule and Dispatch Engine 104 and the Data Historian 107. In embodiments, the Forecast Aggregation 307 may use various factors, such as time of day, day of week, season, size of available historical dataset, and/or self-reported forecast confidence/uncertainty, to name a few, to determine which forecast or which weighted average of forecasts to use.

Figure 10:
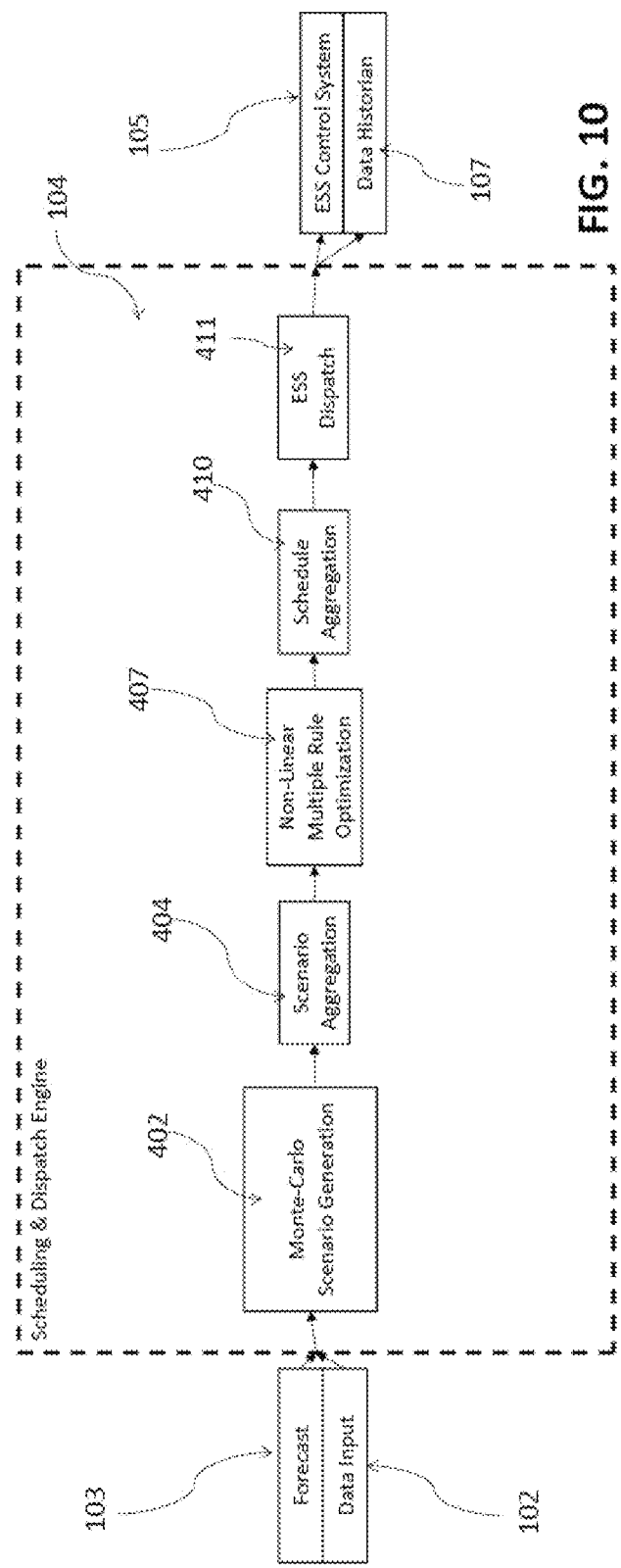
FIG. 10 is a schematic diagram of an exemplary Scheduling and Dispatch Engine implemented in the system of FIG. 8 in accordance with an exemplary embodiment of the present invention.

FIG. 10 is a schematic diagram of an exemplary implementation of the Scheduling and Dispatch Engine 104 for solar energy and storage application in the system 100 of FIG. 8. In this exemplary embodiment, the Scheduling and Dispatch Engine 104 may be configured to receive the net load forecast and forecast uncertainty from the Forecast Engine 103 and the current system constraints from the Data Input Interface 102. Based on these inputs, the Monte-Carlo Scenario Generation technique 402 may be used to generate a predetermined number of permutations on the current forecast based on the forecast uncertainty.

The Scenario Aggregator 404 may be configured to select a subset of those Monte-Carlo forecast scenarios based on, for example, the system configuration, available computational time and resources, and/or reported forecast uncertainty, to name a few.

The Non-Linear Multiple Rule Optimization Scheduler 407 executes on each of the generated Monte-Carlo forecast scenarios to seek an ESS dispatch schedule that optimizes a goal (e.g., minimizing peak net load after ESS operation) while complying with the required constraints (e.g., battery state of charge, system power, etc). In this way, the Non-Linear Multiple Rule Optimization Scheduler 407 generates an optimal dispatch schedule for each of the Monte-Carlo forecast scenarios and passes them to the Schedule Aggregation 410. The Schedule Aggregation 410 may average the received dispatch schedules (e.g., by averaging, weighted averaging, time-variable weighted averaging, condition variable weighted averaging, neural network, etc.) to create a final dispatch schedule.

The ESS Dispatch 411 receives and stores the final dispatch schedule from the Schedule Aggregation 410. The ESS Dispatch 411 may save the final dispatch schedule to the Data Historian 107 and send commands based on the final dispatch schedule at the appropriate time to the ESS Control System 105.

Figure 11:
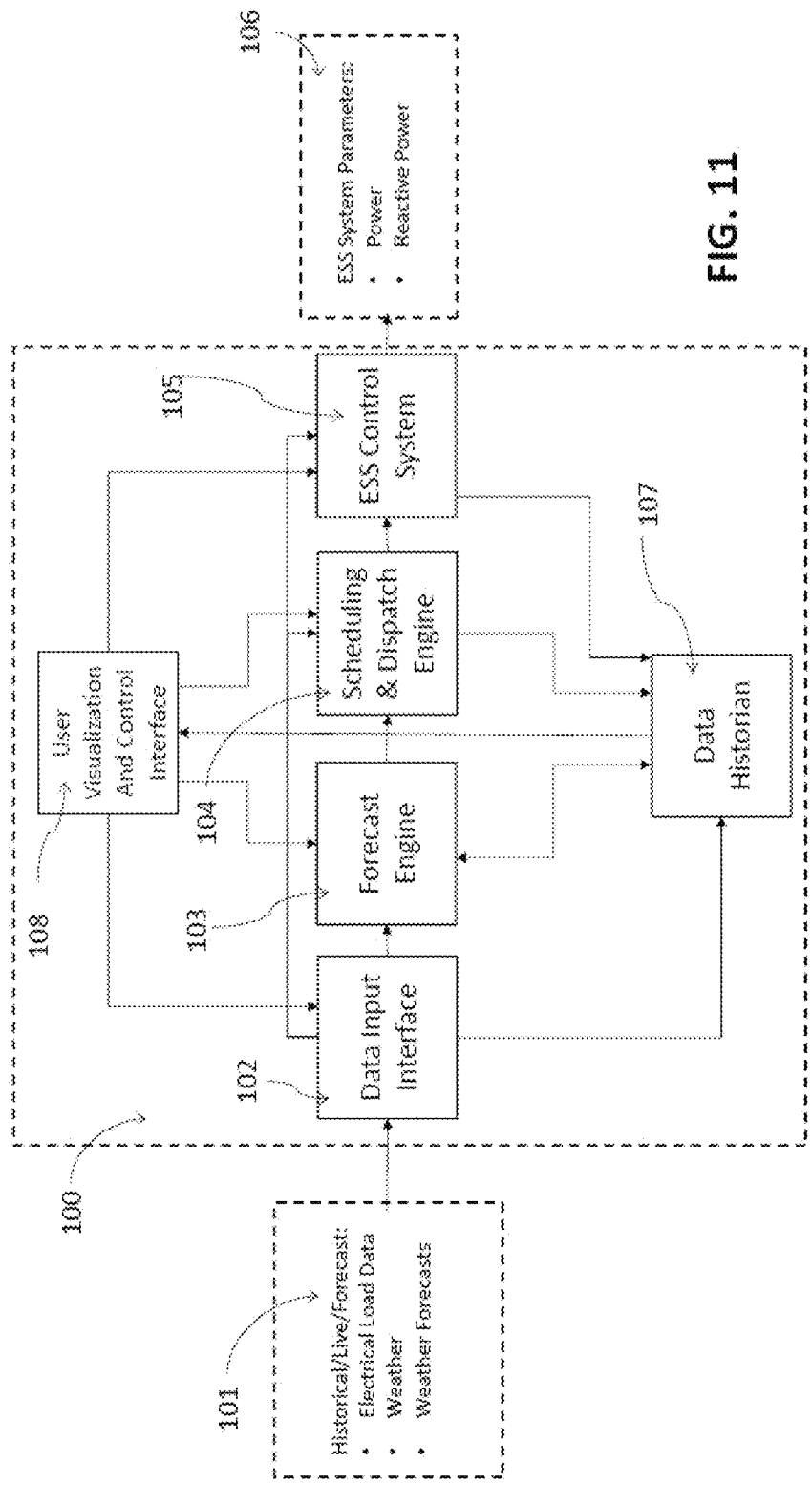
FIG. 11 is a schematic diagram of yet another exemplary implementation of the system of FIG. 1 in accordance with an exemplary embodiment of the present invention.

FIG. 11 is a schematic diagram of yet another exemplary implementation of the system 100 of FIG. 1 in accordance with an exemplary embodiment of the present invention. This exemplary embodiment may be implemented for a demand charge reduction application for an independent ESS system operator.

In this exemplary embodiment, a variety of data sources 101 may be made available to and read by the Data Input interface 102. Possible data sources 101 may include historical and forecasted weather, independent system operator's ESS system information and/or additional variables, such as historical load and electricity prices. The variables may depend on the independent system operator and the data it provides. The Data Input Interface 102 may be configured to collect all data that is relevant to generation of forecasts and dispatch schedule. The Data Input Interface 102 then routes these data feeds to the various blocks in the system 100 that may require them.

The Forecast Engine 103 may collect new and historic data from the Data Input Interface 102 and the Data Historian 107, respectively. The Forecast Engine 103 may be configured to use this data to estimate, for example, the probability of a system peak occurring in each of the next 24 hours. In embodiments, the Forecast Engine 103 may be configured to generate a new forecast as soon as new relevant data is available.

In this exemplary embodiment, the Scheduling and Dispatch Engine 104 may take the forecasts generated by the Forecast Engine 103 and, through a variety of methods such as those described above in connection with FIGS. 4 and 7, determine an optimal dispatch schedule that is configured to, for example, minimize customer load during a peak hour. This dispatch schedule is then sent as commands to the ESS Control System 105 for execution. In embodiments, the Scheduling and Dispatch Engine 104 may be configured to generate a new dispatch schedule as soon as new relevant data is available.

The ESS Control System 105 receives the commands from the Scheduling and Dispatch Engine 104. Based on the received commands, combined with the live data feeds from the Data Input Interface 102, the ESS Control System 105 may determine ESS system parameters 106, such as real power, reactive power, to name a few, which determine the actions that the ESS Control System 105 may execute, such as inputting or extracting power from the grid or microgrid to which it may be directly or indirectly connected. In embodiments, the ESS Control System 105 may send the ESS system parameters 106 to the battery systems (e.g., inverters, battery management controllers, etc.) in order to command how much real and reactive power is being input or extracted from the grid or microgrid.

The Data Historian 107 may be configured to collect, store and manage all data that is passed to it. In addition, the Data Historian 107 may further be configured to record the time and any other relevant meta-data for each piece of information being stored and recorded. In embodiments, the Data Historian 107 may be configured to supply historical datasets to various blocks in the system 100, such as the Forecast Engine 103 and the User Visualization and Control Interface 108.

The User Visualization and Control Interface 108 may be configured to allow a human operator to monitor both the current and historical performance and state of the entire system 100. For example, the User Visualization and Control Interface 108 may be implemented, at least in part, via a web-based tool which gives easy access to well-curated data sets as well as more universal access to any value stored in the Data Historian 107. The User Visualization and Control Interface 108 may also be configured to send manual controls to any of the blocks in the system 100 in order to control such behaviors as execution timing, decision overriding, to name a few.

Figure 12:
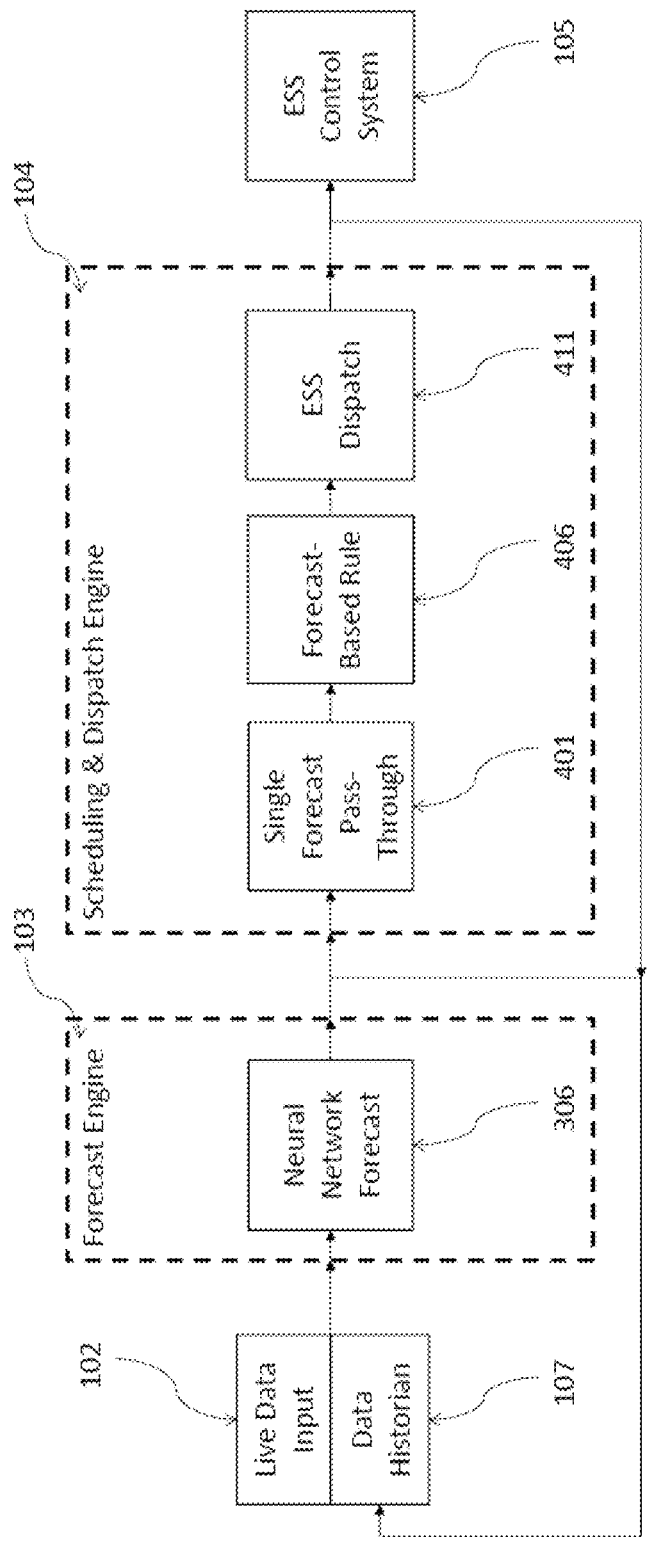
FIG. 12 is a schematic diagram of an exemplary Forecast Engine and an exemplary Scheduling and Dispatch Engine implemented in the system of FIG. 11 in accordance with an exemplary embodiment of the present invention.

FIG. 12 is a schematic diagram of an exemplary implementation of the Forecast Engine 103 and Scheduling and Dispatch Engine 104 for demand charge reduction application in the system of FIG. 11, in accordance with an exemplary embodiment of the present invention. In this exemplary embodiment, the Forecast Engine 103 may receive live data updates 101 from the Data Input Interface 102 as well as a necessary trailing history comprising the recent historical dataset (e.g., the last 6 hours of grid load) from the Data Historian 107. The Forecast Engine 103 may use the Neural Network Forecast technique 306 based on the input data to determine the probability of, for example, each hour, in the following 24 hours, being a system peak hour. This system peak hour forecast is passed to the Schedule and Dispatch Engine 104.

In this exemplary embodiment, the Schedule and Dispatch Engine 104 may use the Single Forecast Pass-Through technique 401 to pass the received forecast to the Forecast-Based Rule Scheduler 406, without further processing the forecast and without passing the forecast through a Scenario Aggregator 404. The Forecast Based Rule Scheduler 406 may be configured to generate an optimal dispatch schedule based on the received forecast and the state of the ESS, with the goal of, for example, maximizing ESS output during a peak hour. The generated dispatch schedule is then passed to the ESS Dispatch 411, which determines the system dispatch and passes it onto the ESS Control System 105. In embodiments, the forecast produced by the Forecast Engine 103 and the dispatch schedule generated by the Scheduling and Dispatch Engine 104 may also be sent to the Data Historian 107 to, for example, inform future forecasts and for use in the User Visualization and Control Interface 108 (not shown in FIG. 12).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in a non-transitory information carrier (e.g., in a machine readable storage device), or embodied in a propagated signal, for execution by, or to control the operation of, data processing apparatus (e.g., a programmable processor, a computer, multiple computers, to name a few). The subject matter described herein can be implemented in one or more local, cloud, and/or hybrid servers and/or one or more local, cloud, and/or hybrid data stores. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit), to name a few.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., erasable programmable read-only memory (EPROM), electrically erasable programmable read-only memory (EEPROM), and flash memory devices); magnetic disks, (e.g., internal hard disks or removable disks); magneto optical disks; and optical disks (e.g., compact discs (CDs) and digital versatile discs (DVDs)), The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), or a touchscreen, by which the user can provide input to the computer. Other kinds of devices (e.g., a smart phone, a tablet PC, to name a few) can be used to provide for interaction with a user as well. For example, feedback provided to the user can be any form of sensory feedback, (e.g., visual feedback, auditory feedback, or tactile feedback, to name a few), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the methodology and tools of the present invention, what has been described herein is merely illustrative of the application of the principles of the present invention. For example, the appearance, the features, the inputs and outputs and the mathematical algorithms of components described herein can be varied to suit a particular application. Accordingly, this description is meant to be taken only by way of example, and not to otherwise limit the scope of this invention.

To the extent certain functionality or components "can" or "may" be performed or included, respectively, the identified functionality or components are not necessarily required in all embodiments, and can be omitted from certain embodiments of the invention.

To the extent that the foregoing description refers to the "invention" or "present invention," the present disclosure may include more than one invention.

What is claimed is:

1. A method, comprising:
receiving, via at least one processor, data associated with an energy storage system;
one of calculating or receiving, via the at least one processor, a forecast for at least one parameter associated with the energy storage system and an associated forecast uncertainty based on the received data;
determining, via the at least one processor and based on the forecast, a selected dispatch schedule for the energy storage system, by:
generating at least one forecast scenario;
selecting, for optimization, at least a subset of the at least one forecast scenario;
generating a plurality of candidate dispatch schedules based on the selected at least a subset of the at least one forecast scenario; and
aggregating the plurality of candidate dispatch schedules to produce the selected dispatch schedule;
determining at least one energy storage system parameter based on the selected dispatch schedule; and
sending the at least one energy storage system parameter to a control system of the energy storage system to control an operation of the energy storage system.

2. The method of claim 1, wherein the at least one processor includes a cloud-based processor.

3. The method of claim 1, further comprising selecting at least one mode based on the selected dispatch schedule, the at least one mode including a load leveling mode.

4. The method of claim 1, further comprising selecting at least one mode based on the selected dispatch schedule, the at least one mode including a peak shaving mode.

5. The method of claim 1, further comprising selecting at least one mode based on the selected dispatch schedule, the at least one mode including a state of charge (SOC) maintenance mode.

6. The method of claim 1, wherein the data includes data associated with an energy price for a real-time market, an energy price for a day-ahead market, an ancillary service price, an ancillary services price for a day-ahead market, a market condition, a weather condition, an electricity demand, an electrical generation, a power generator availability, a net substation load, solar generation, temperature, a third-party forecast, a grid load condition, an energy storage condition, or an independent system operator (ISO) signal.

7. The method of claim 1, wherein the data includes data associated with solar generation.

8. The method of claim 1, wherein the data includes data associated with a market condition.

9. The method of claim 1, wherein the data includes data associated with one of a grid load condition or an energy storage condition.

10. The method of claim 1, wherein the data includes data associated with a net substation load.

11. The method of claim 1, wherein the at least one parameter associated with the energy storage system includes a target grid net real power.

12. The method of claim 1, wherein the at least one parameter associated with the energy storage system includes at least one of a maximum grid net real power or a minimum grid net real power.

13. The method of claim 1, wherein one of the calculating the forecast or the determining the selected dispatch schedule is performed as soon as new relevant data is available.

14. The method of claim 1, wherein the at least one energy storage system parameter includes one of a target reactive power or power factor.

15. The method of claim 1, wherein the control system controls the operation of the energy storage system in a closed-loop configuration, and is configured to react to feedback generated in the energy storage system.

16. A method, comprising:
receiving, via at least one processor, data associated with an energy storage system;
calculating, via the at least one processor, a forecast for at least one parameter associated with the energy storage system and an associated forecast uncertainty based on the received data;
determining a selected dispatch schedule for the energy storage system, based on the forecast, by one of:
(i) generating a plurality of candidate dispatch schedules, and
receiving a signal representing the selected dispatch schedule, the selected dispatch schedule including at least one candidate dispatch schedule from the plurality of candidate dispatch schedules, or
(ii) retrieving the selected dispatch schedule from a memory operably coupled to the at least one processor;
determining at least one energy storage system parameter based on the selected dispatch schedule; and
sending the at least one energy storage system parameter to a control system of the energy storage system to control an operation of the energy storage system.

17. The method of claim 16, wherein the at least one processor includes a cloud-based processor.

18. The method of claim 16, wherein the control system controls the operation of the energy storage system in a closed-loop configuration, and is configured to react to feedback generated in the energy storage system.

19. A method, comprising:
receiving, via at least one processor, first forecast data associated with an energy storage system;
receiving, at the at least one processor, second forecast data associated with the energy storage system;
determining, via the at least one processor and based on the first forecast data and the second forecast data, a dispatch schedule for the energy storage system, the determining the dispatch schedule including:
selecting, for optimization, at least a subset of the first forecast data and the second forecast data;
generating a plurality of candidate dispatch schedules based on the first forecast data and the second forecast data; and
identifying the dispatch schedule based on the plurality of candidate dispatch schedules; and
sending at least one command, via the at least one processor and based on the dispatch schedule, to a control system of the energy storage system to control an operation of the energy storage system.

20. The method of claim 19, further comprising calculating, via the at least one processor, a forecast associated with the energy storage system, based on the solar generation forecast data and the energy price forecast data, the determining the dispatch schedule being based on the forecast.

21. The method of claim 19, wherein the first forecast data includes solar generation forecast data and the second forecast data includes energy price forecast data.

22. The method of claim 19, wherein determining the dispatch schedule includes aggregating the plurality of candidate dispatch schedules.

23. The method of claim 19, wherein the at least one command is sent to the control system at a predetermined time, in accordance with the dispatch schedule.

24. The method of claim 19, wherein the energy price forecast data includes energy prices at each multiple different times of day.

25. The method of claim 19, wherein the dispatch schedule includes at least one action to be performed by the control system, and a timing for each action from the at least one action.

26. The method of claim 19, wherein the at least one command includes a command to output a fixed power from the energy storage system irrespective of other inputs from the energy storage system.

27. The method of claim 19, wherein the control system controls the operation of the energy storage system in a closed-loop configuration, and is configured to react to feedback generated in the energy storage system.

28. The method of claim 19, wherein the at least one processor includes a cloud-based processor.

* * * * *

UNITED STATES PATENT AND TRADEMARK OFFICE
CERTIFICATE OF CORRECTION

PATENT NO. : 11,876,374 B2
APPLICATION NO. : 16/916778
DATED : January 16, 2024
INVENTOR(S) : Doherty et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this
Eighth Day of October, 2024

Katherine Kelly Vidal
*Director of the United States Patent and Trademark Office*